US012646497B2

(12) United States Patent
Ding et al.

(10) Patent No.: US 12,646,497 B2
(45) Date of Patent: Jun. 2, 2026

(54) METHOD AND APPARATUS FOR PROCESSING VIRTUAL CONCERT, DEVICE, STORAGE MEDIUM, AND PROGRAM PRODUCT

(71) Applicant: Tencent Technology (Shenzhen) Company Limited, Shenzhen (CN)

(72) Inventors: Danjun Ding, Shenzhen (CN); Xin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 244 days.

(21) Appl. No.: 18/217,342

(22) Filed: Jun. 30, 2023

(65) Prior Publication Data

US 2023/0343321 A1 Oct. 26, 2023

Related U.S. Application Data

(63) Continuation of application No. PCT/CN2022/121949, filed on Sep. 28, 2022.

(30) Foreign Application Priority Data

Nov. 22, 2021 (CN) ......................... 202111386719.X

(51) Int. Cl.
*G10L 13/033* (2013.01)

(52) U.S. Cl.
CPC .................................. *G10L 13/033* (2013.01)

(58) Field of Classification Search
CPC ..................................................... G10L 13/033
See application file for complete search history.

(56) References Cited

U.S. PATENT DOCUMENTS 10,008,193 B1 * 6/2018 Harvilla .................... G10H 1/20
2006/0009979 A1 * 1/2006 McHale ................ A63F 13/814 704/270
2009/0038468 A1 * 2/2009 Brennan .................. G09B 5/06 84/609
2010/0300269 A1 * 12/2010 Applewhite ......... G10H 1/0058 84/610

(Continued)

FOREIGN PATENT DOCUMENTS

CN 104464725 A 3/2015
CN 107767846 A 3/2018

(Continued)

OTHER PUBLICATIONS

Tencent Technology, WO, PCT/CN2022/121949, Nov. 18, 2022, 5 pgs.

(Continued)

*Primary Examiner* — Bryan S Blankenagel
(74) *Attorney, Agent, or Firm* — Morgan, Lewis & Bockius LLP

(57) ABSTRACT

This application provides a method for processing a virtual concert performed by a computer device. The method includes: receiving a concert creation instruction for a target singer; creating a concert room for simulating singing a song of the target singer in response to the concert creation instruction; collecting a singing content of the song of the target singer in the simulated singing of a current object; and playing the singing content through the concert room to terminals of objects.

17 Claims, 17 Drawing Sheets

(56) References Cited

U.S. PATENT DOCUMENTS

| | | | | |
|---|---|---|---|---|
| 2015/0256613 | A1* | 9/2015 | Walker | H04L 67/06 709/217 |
| 2020/0047074 | A1* | 2/2020 | Zhang | G06F 3/011 |
| 2021/0035559 | A1* | 2/2021 | Xu | G10L 15/063 |
| 2021/0049926 | A1* | 2/2021 | Arellano Nava | G09G 3/32 |
| 2021/0366174 | A1* | 11/2021 | Reilly | G06T 19/20 |

FOREIGN PATENT DOCUMENTS

| | | | |
|---|---|---|---|
| CN | 108922562 | A | 11/2018 |
| CN | 110010159 | A | 7/2019 |
| CN | 110176221 | A | 8/2019 |
| CN | 110264986 | A | 9/2019 |
| CN | 112637622 | A | 4/2021 |
| CN | 114120943 | A | 3/2022 |
| JP | H 10161682 | A | 6/1998 |
| JP | 2004500662 | A | 1/2004 |
| JP | 2005099288 | A | 4/2005 |
| JP | 2007233078 | A | 9/2007 |
| JP | 2009237503 | A | 10/2009 |
| JP | 2015210344 | A | 11/2015 |
| JP | 2017032725 | A | 2/2017 |
| JP | 2020194030 | A | 12/2020 |

OTHER PUBLICATIONS

Tencent Technology, IPRP, PCT/CN2022/121949, May 2, 2024 6 pgs.

Tencent Technology, ISR, PCT/CN2022/121949, Nov. 18, 2022, 3 pgs.

Tencent Technology, Japanese Office Action, JP Patent Application No. 2024-515164, Jan. 27, 2025, 8 pgs.

* cited by examiner

METHOD AND APPARATUS FOR PROCESSING VIRTUAL CONCERT, DEVICE, STORAGE MEDIUM, AND PROGRAM PRODUCT

CROSS-REFERENCE TO RELATED APPLICATIONS

This application is a continuation application of PCT Patent Application No. PCT/CN2022/121949, entitled "METHOD AND APPARATUS FOR PROCESSING VIRTUAL CONCERT, DEVICE, STORAGE MEDIUM, AND PROGRAM PRODUCT" filed on Sep. 28, 2022, which claims priority to Chinese Patent Application No. 202111386719.X, entitled "METHOD AND APPARATUS FOR PROCESSING VIRTUAL CONCERT, DEVICE, STORAGE MEDIUM, AND PROGRAM PRODUCT" filed on Nov. 22, 2021, all of which is incorporated by reference in its entirety.

FIELD OF THE TECHNOLOGY

This application relates to computer technologies and speech technologies, and in particular, to a method and apparatus for processing a virtual concert, a device, a non-transitory computer-readable storage medium and a computer program product.

BACKGROUND OF THE DISCLOSURE

With the maturity of speech technologies, people have more exploration and pursuit for the development and application of the speech technologies. In terms of music, imitating highly professional and charismatic singers to sing has become a goal that people pursue. For example, a user performs reverberation and various personalized speech changes after recording songs, so that the user who cannot sing can also happily participate in song recording, publishing, sharing, and so on. However, related technologies can only provide users with the aforementioned simple and random singing and are not yet available for the users to create or hold virtual concerts of specific singers.

SUMMARY

Embodiments of this application provide a method and apparatus for processing a virtual concert, a device, a non-transitory computer-readable storage medium and a computer program product, which can be used by a user to create or hold a virtual concert of a target singer.

Technical solutions in the embodiments of this application are implemented as follows:

An embodiment of this application provides a method for processing a virtual concert performed by a computer device, the method including:

- receiving a concert creation instruction for a target singer;
- creating a concert room for simulating singing a song of the target singer in response to the concert creation instruction;
- collecting a singing content of the song of the target singer in the simulated singing of a current object; and
- playing the singing content through the concert room to terminals of objects.

An embodiment of this application provides an electronic device, including:

- a memory, configured to store a computer-executable instruction; and
- a processor, configured to implement, when executing the computer-executable instruction stored in the memory, the method for processing the virtual concert provided by this embodiment of this application.

An embodiment of this application provides a non-transitory computer-readable storage medium, storing an executable instruction, which is used for, when executed by a processor of an electronic device, causing the electronic device to implement the method for processing the virtual concert provided by this embodiment of this application.

The embodiments of this application have the following beneficial effects:

- through the embodiments of this application, the current object can create the concert room for the target singer through the concert entrance, and sing the song of the target singer through the concert room for online viewing by the objects in the concert room, which realizes reproduced performance of a concert of the target singer, and this exhibition and performance manner facilitates better transfer of emotions for the target singer, provides more entertainment choices for users and meets the increasing diversified requirements for user information; and in addition, as the created concert room corresponds to the target singer, objects entering the concert room can enjoy a plurality of songs of the target singer continuously, which realizes continuous sharing for the songs of the target singer by the current object, and improves the song sharing efficiency for specific objects, compared with a point-to-point song sharing manner in the related art, a user does not need to execute a song sharing operation repeatedly, and when songs to be shared are a plurality of songs for a certain specific singer, a sharing flow for the plurality of songs is simplified, and the human-machine interaction efficiency is improved.

DESCRIPTION OF EMBODIMENTS

Figure 1:
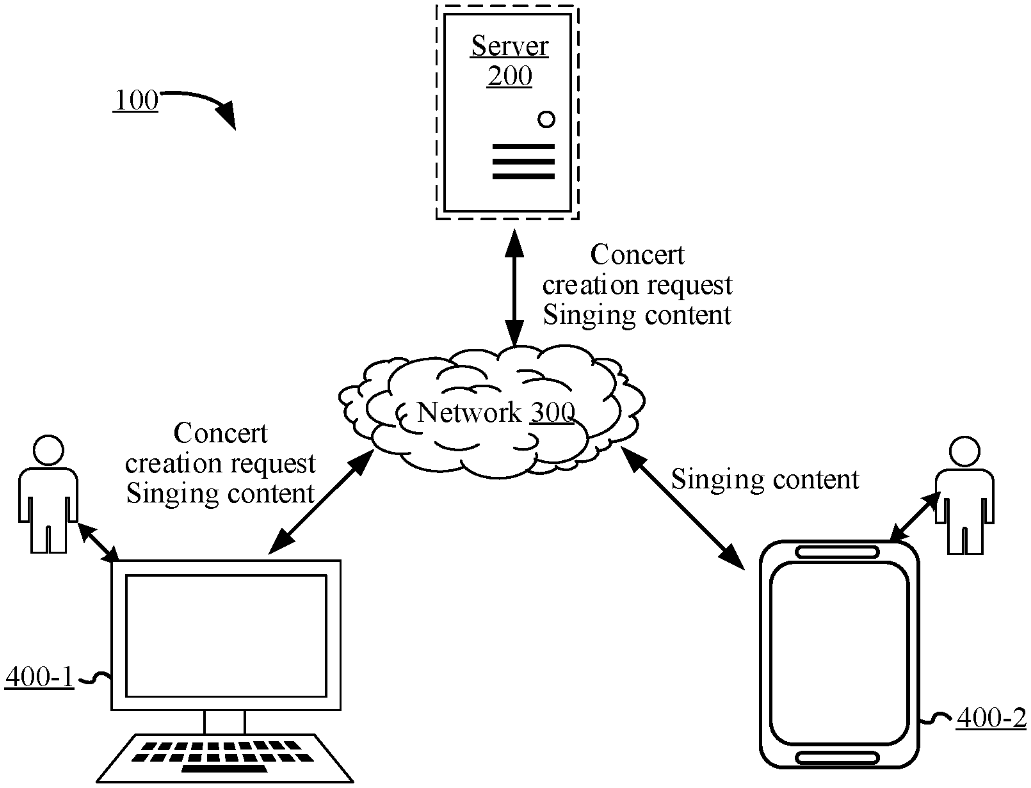
FIG. 1 is a schematic architectural diagram of a processing system 100 for a virtual concert provided by an embodiment of this application.

To make the objectives, technical solutions, and advantages of embodiments of this application clearer, the following describes the embodiments of this application in further detail with reference to the accompanying drawings. The described embodiments are not to be considered as a limitation to this application. All other embodiments obtained by a person of ordinary skill in the art without creative efforts shall fall within the protection scope of this application.

In the following description, involved "some embodiments" describe subsets of all possible embodiments, but it may be understood that "some embodiments" may be the same subset or different subsets of all the possible embodiments, and can be combined with each other without conflict.

In the following description, the involved terms "first/second . . . " are merely intended to distinguish between similar objects rather than represent specific orders for objects. It may be understood that, "first/second . . . " may be interchanged in specific sequence or order if allowed, so that the embodiments of this application described herein can be implemented in a sequence other than those illustrated or described herein.

Unless otherwise defined, meanings of all technical and scientific terms used in this specification are the same as those usually understood by a person of skill in the technical field to which this application belongs. The terms used herein are merely intended to describe objectives of the embodiments of this application, but are not intended to limit this application.

Before the embodiments of this application are described in detail, a description is made on nouns and terms involved in the embodiments of this application, and the nouns and terms involved in the embodiments of this application are applicable to the following explanations.

Client, which is an application running in a terminal to provide various services, such as an instant messaging client, a video playing client, a live broadcast client, a learning client and a singing client.

In response to, which is used for representing a condition or state an executed operation relies on, and when the relied condition or state is met, one or more executed operations may be real-time or may have a set delay; and there is no limitation on an execution order of the plurality of executed operations without special descriptions.

Speech conversion, referring to a technology of changing the timbre of a speech in general, the technology may convert the timbre of the speech from a speaker A to a speaker B, where the speaker A is a person saying the speech, and is generally called a source speaker; while the speaker B is a speaker having a converted target timbre, and is generally called a target speaker. Current language conversion technologies may be classified into three types: one-to-one (can only convert a speech of a certain person to a speech of another person), many-to-one (may convert a speech of any person to a speech of a certain person) and many-to-many (may convert a speech of any person to a speech of any other person).

Phoneme, referring to a minimum phonetic unit obtained by performing division according to a natural attribute of a speech.

Phonetic posterior Grams (PPG), which is a matrix with the size being the number of audio frames*the number of phonemes, and is used for describing a probability of a phoneme that may be uttered by each audio frame in an audio fragment.

Naturalness degree, one of common evaluation metrics in a speech synthesizing task or a speech conversion task, used for measuring whether a speech sounds as natural as real people speaking.

Similarity, one of common evaluation metrics in a speech conversion task, used for measuring whether a speech sounds similar to the sound of a target speaker.

Spectrum, referring to frequency domain information obtained by performing Fourier transformation on a sound signal, it is generally considered that the sound signal is formed by superposing a plurality of sine waves, while the spectrum may describe the waveform composition of the sound signal more clearly. If discretization representation is performed on a frequency, the spectrum is a one-dimensional vector (only a frequency dimension).

Spectrogram, referring to a spectrogram obtained by superposing spectra along a time dimension, the spectra are obtained by performing sharding by frame on a sound (may include some intra-frame signal processing steps similar to windowing) and then performing Fourier transformation on each frame of signal, and the spectrogram may reflect, on the time dimension, the change of the sine waves superposed in the sound signal over time. A Mel spectrogram, a Mel diagram for short, refers to a spectrogram obtained by performing filtering on the spectra by using a filter that has been designed already on the basis of the spectrogram, and compared with a general spectrogram, it has fewer frequency dimensions and focuses more on a low-frequency-band sound signal to which human ears are more sensitive; and it is generally considered that, compared with the sound signal, the Mel diagram is easier for extraction/separation of its information and easier for modification of sound.

Referring to FIG. 1, FIG. 1 is a schematic architectural diagram of a processing system 100 for a virtual concert provided by an embodiment of this application. In order to support an exemplary application, terminals (exemplarily, a terminal 400-1 and a terminal 400-2 are shown) are connected with a server 200 through a network 300, the network 300 may be a wide area network or a local area network, or a combination of the two, and data transmission is achieved by using a wireless link.

In practical applications, the terminals may be a smart phone, a tablet, a laptop and other various types of user terminals, and may also be a desktop computer, a television or a combination of any two or more of these data processing devices. The server 200 may be one server configured alone to support various businesses, may also be configured as a server cluster, and may also be a cloud server, etc.

In practical applications, clients are arranged on the terminals, such as an instant messaging client, a video playing client, a live broadcast client, a learning client and a singing client. When a user (current object) turns on the clients on the terminals to practice singing or create a virtual concert, the terminals receive a concert creation instruction for a target singer based on a presented concert entrance; and send to the server 200 a creation request of requesting to create a concert room for simulating singing a song of the target singer in response to the concert creation instruction; the server 200 creates the concert room for simulating singing the song of the target singer based on the creation request and returns the concert room to the terminals for displaying; when the current user sings the song of the target singer in the concert room, the terminals collect a singing content of the song of the target singer in simulated singing of the current object and send the collected singing content to the server 200; and the server 200 distributes the received singing content to terminals of various objects entering the concert room, so that the singing content is played in the terminals through the concert room.

Figure 2:
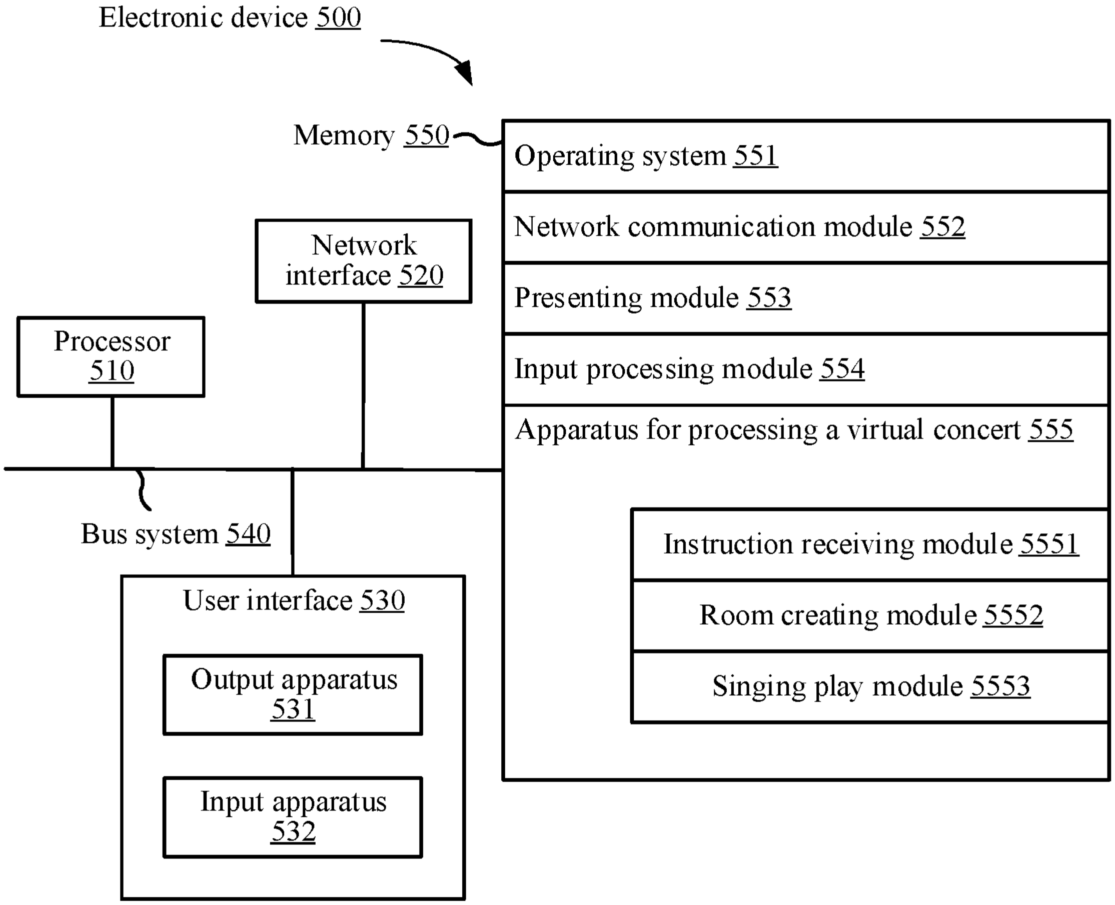
FIG. 2 is a schematic structural diagram of an electronic device 500 provided by an embodiment of this application.

Referring to FIG. 2, FIG. 2 is a schematic structural diagram of an electronic device 500 provided by an embodiment of this application. In practical applications, the electronic device 500 may be the terminals or the server 200 in FIG. 1, and an electronic device for implementing a method for processing a virtual concert in this embodiment of this application is described by taking an example that the electronic device is the terminal shown in FIG. 1. The electronic device 500 shown in FIG. 2 includes: at least one processor 510, a memory 550, at least one network interface 520 and a user interface 530. All components in the electronic device 500 are coupled together through a bus system 540. It may be understood that, the bus system 540 is configured to implement connection and communication between the components. In addition to a data bus, the bus system 540 further includes a power bus, a control bus, and a state signal bus. But, for ease of clear description, all types of buses in FIG. 2 are marked as the bus system 540.

The processor 510 may be an integrated circuit chip and has a signal processing capability, such as a general-purpose processor, a digital signal processor (DSP), or other programmable logic devices, discrete gate or transistor logic devices, discrete hardware components, or the like. The general-purpose processor may be a microprocessor or any conventional processor, etc.

The user interface 530 includes one or more output apparatuses 531 capable of presenting media contents, and includes one or more speakers and/or one or more visual display screens. The user interface 530 further includes one or more input apparatuses 532, and includes user interface parts facilitating user input, such as a keyboard, a mouse, a microphone, a touch display screen, a camera and other input buttons and controls.

The memory 550 is removable, unremovable or a combination thereof. Exemplary hardware devices include a solid state memory, a hard drive, an optical disc drive and the like. The memory 550 may include one or more storage devices away from the processor 510 physically.

The memory 550 includes a volatile memory or a non-volatile memory, or may include both a volatile memory and a non-volatile memory. The non-volatile memory may be a read only memory (ROM), and the volatile memory may be a random access memory (RAM). The memory 550 described in this embodiment of this application aims to include any suitable type of memory.

In some embodiments, the memory 550 can store data to support various operations, and examples of these data include a program, a module and a data structure or a subset or superset thereof, which are described exemplarily below.

An operating system 551 includes system programs configured to process various basic system services and execute hardware-related tasks, such as a frame layer, a core library layer, and a drive layer, and is configured to implement various basic businesses and process tasks based on hardware.

A network communication module 552 is configured to reach other computing devices via one or more (wired or wireless) network interfaces 520, and an exemplary network interface 520 includes: Bluetooth, wireless fidelity (WiFi), a universal serial bus (USB) and the like.

A presenting module 553 is configured to present information via one or more output apparatuses 531 (e.g., a display screen, a loudspeaker and the like) associated with the user interface 530 (e.g., a user interface for operating a peripheral device and displaying contents and information).

An input processing module 554 is configured to detect one or more user inputs or interactions from one of one or more input apparatuses 532 and translate the detected inputs or interactions.

In some embodiments, an apparatus for processing a virtual concert provided by an embodiment of this application may be implemented in a software manner. FIG. 2 shows an apparatus 555 for processing a virtual concert stored in the memory 550, and the apparatus may be software in the form of a program and a plug-in, and includes following software modules: an instruction receiving module 5551, a room creating module 5552 and a singing play module 5553. These modules are logical, so that the modules may be combined or split arbitrarily according to implemented functions, and functions of the modules will be described below.

In other embodiments, the apparatus for processing the virtual concert provided by this embodiment of this application may be implemented in a hardware manner, as an example, the apparatus for processing the virtual concert provided by this embodiment of this application may be a processor in the form of a hardware decoding processor, and the processor is programmed to execute the method for processing the virtual concert provided by this embodiment of this application. For example, the processor in the form of the hardware decoding processor may adopt one or more application specific integrated circuits (ASICs), a DSP, a programmable logic device (PLD), a complex programmable logic device (CPLD), a field-programmable gate array (FPGA), or other electronic elements.

In some embodiments, the terminals or the server may implement the method for processing the virtual concert provided by this embodiment of this application by running computer programs. By way of example, the computer programs may be native programs or software modules in the operating system; the computer programs may be native applications (APPs), namely programs that can only run after being installed in an operating system, such as a live broadcast APP or an instant messaging APP; the computer programs may also be applets, namely programs that can run just by being downloaded to a browser environment; and the computer programs may also be applets that can be embedded into any APP. To sum up, the above computer programs may be applications, modules or plug-ins in any form.

Figure 3:
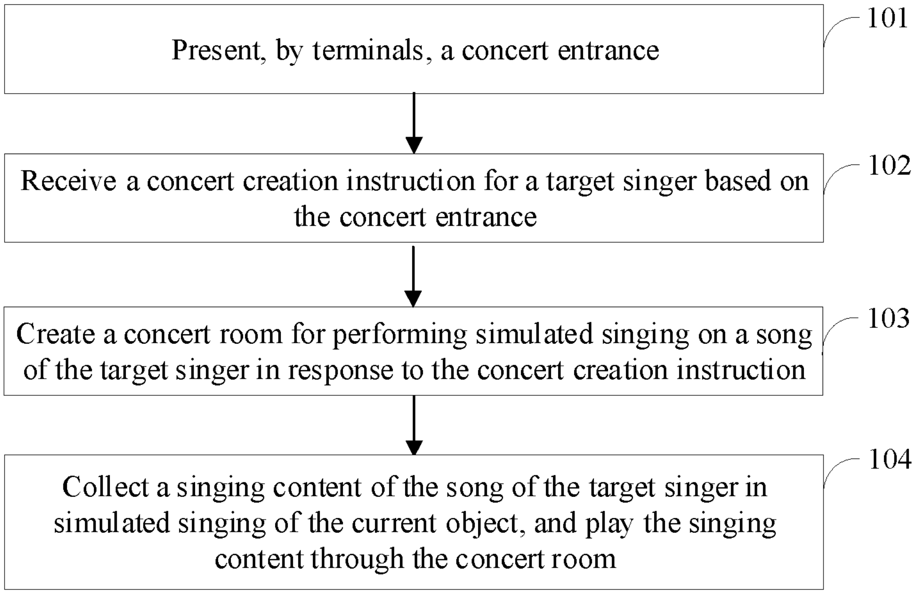
FIG. 3 is a schematic flowchart of a method for processing a virtual concert provided by an embodiment of this application.

The method for processing the virtual concert provided by this embodiment of this application will be described below with reference to the accompanying drawings. The method for processing the virtual concert provided by this embodiment of this application may be performed by the terminals in FIG. 1 alone, and may also be performed cooperatively by the terminals and the server 200 in FIG. 1. In the following, a description is made by taking an example that the method for processing the virtual concert provided by this embodiment of this application is performed by the terminals in FIG. 1 alone. Referring to FIG. 3, FIG. 3 is a schematic flowchart of the method for processing the virtual concert provided by this embodiment of this application, and the description will be made in combination with steps shown in FIG. 3.

The method shown in FIG. 3 may be performed by various forms of computer programs running on the terminals, the computer programs are not limited to the above clients, and may also be the operating system 551 described above, a software module and a script, and thus the clients shall not be seen as a limitation to this embodiment of this application.

Step 101: Present, by the terminals, a concert entrance.

In practical applications, clients are arranged on the terminals, such as an instant messaging client, a video playing client, a live broadcast client, a learning client and a singing client. A user may listen to songs, sing or hold a concert corresponding to a target singer through the clients on the terminals, in practical applications, the terminals present a song practice interface, and the concert entrance for creating the virtual concert is presented in the song practice interface, so that the concert is created or held based on the concert entrance.

The above concert corresponding to the target singer is the virtual concert created or held by the user (not the same person as the target singer) in essence, the so-called virtual concert refers to a concert for simulating or imitating singing of the target singer, the user can imitate songs which are sung by a specific singer based on the created virtual concert, the virtual concert here usually corresponds to the singer, such as a virtual concert of a singer A and a virtual concert of a singer B, and taking the virtual concert of the singer A as an example, creating or holding the virtual concert of the singer A by the user means that the user creates a concert room for simulating singing songs of the singer A. In other words, the concert room for the user to sing songs of an original singer by simulating the timbre of the original singer is created, for example, a concert room for the user to sing a song B of the original singer A by simulating the timbre of the original singer A is created, and songs of the singer A are sung in a simulated mode in the created concert room to achieve the purpose of holding the concert of the singer A. Especially when the simulated singer is a singer who has died (passed away), since the dead singer cannot hold a concert in the real world, reproduced performance of the concert of the dead singer may be achieved by holding the virtual concert, and such exhibition and performance manner facilitates better transfer of emotions for the singer. Therefore, as the created concert room corresponds to the target singer, objects entering the concert room can enjoy a plurality of songs of the target singer continuously, which realizes continuous sharing for the songs of the target singer sung in the simulated mode by the current object, and improves the song sharing efficiency for specific objects, compared with a point-to-point song sharing manner in the related art, the user does not need to execute a song sharing operation repeatedly, and when songs to be shared are a plurality of songs for a certain specific singer, a sharing flow for the plurality of songs is simplified, and the human-machine interaction efficiency is improved. Compared with simple random singing in the related art, the interaction manner of singing is enriched, and improvement of user stickiness and a user retention rate is facilitated.

In some embodiments, the terminals may present the concert entrance in the song practice interface of the current object in the following way: presenting a song practice entrance for performing song practice in the song practice interface; receiving a song practice instruction for the target singer based on the song practice entrance; collecting a practice audio of singing practice performed by the current object on the song of the target singer in response to the song practice instruction; and presenting the concert entrance associated with the target singer in the song practice interface of the current object when determining that the current object has a creation qualification of creating a concert of the target singer based on the practice audio.

In practical applications, in order to give people a realistic auditory feast, it is required to guarantee that a singing level of the current object singing the songs of the target singer is equivalent to own singing level of the target singer, so if the user wants to create the virtual concert of the target singer, the user needs to do singing practice for the songs of the target singer to improve the imitating ability of the user for the songs of the target singer, and the concert entrance associated with the target singer is presented in the song practice interface of the current object only when a practice result represents that the current object has the creation qualification of creating the concert of the target singer (for example, when the current object sings the songs of the target singer, the sound, the timbre and the like are quite close to or have no difference with those of the original singer), so that the concert of the target singer is created through the concert entrance. Of course, in practical applications, a holding qualification requirement of the concert may further be lowered or even canceled to lower a creation threshold of the virtual concert so as to realize a happy-together singing environment of a concert for the whole people.

Here, the creation qualification of the current object for the concert of the target singer is described. In practical applications, the terminals obtain a practice song in latest singing practice of the user for the song of the target singer and compare the practice song with an original singing audio of the target singer on at least one singing dimension (such as the timbre), and when a similarity reaches a similarity threshold value, it is determined that the current object has the creation qualification for the concert of the target singer. In some embodiments, the terminals may further obtain a plurality of (at least two) practice songs in singing practice of the user for the songs of the target singer within a latest period of time and compare the practice songs with original singing audios of the target singer on at least one singing dimension (such as the timbre) respectively to obtain similarities corresponding to the practice songs, the obtained similarities of the at least two practice songs are averaged to obtain an average similarity, and when the average similarity reaches a similarity threshold value, it is determined that the current object has the creation qualification for the concert of the target singer.

In some embodiments, the terminals may receive a song practice instruction for the target singer based on the song practice entrance in the following way: presenting a singer selection interface in response to a trigger operation for the song practice entrance, the singer selection interface including at least one candidate singer; presenting at least one candidate song corresponding to the target singer in response to a selection operation for the target singer in the at least one candidate singer; presenting an audio recording entrance for singing a target song in response to a selection operation for the target song in the at least one candidate song; and receiving the song practice instruction for the target song of the target singer in response to a trigger operation for the audio recording entrance.

Figure 4:
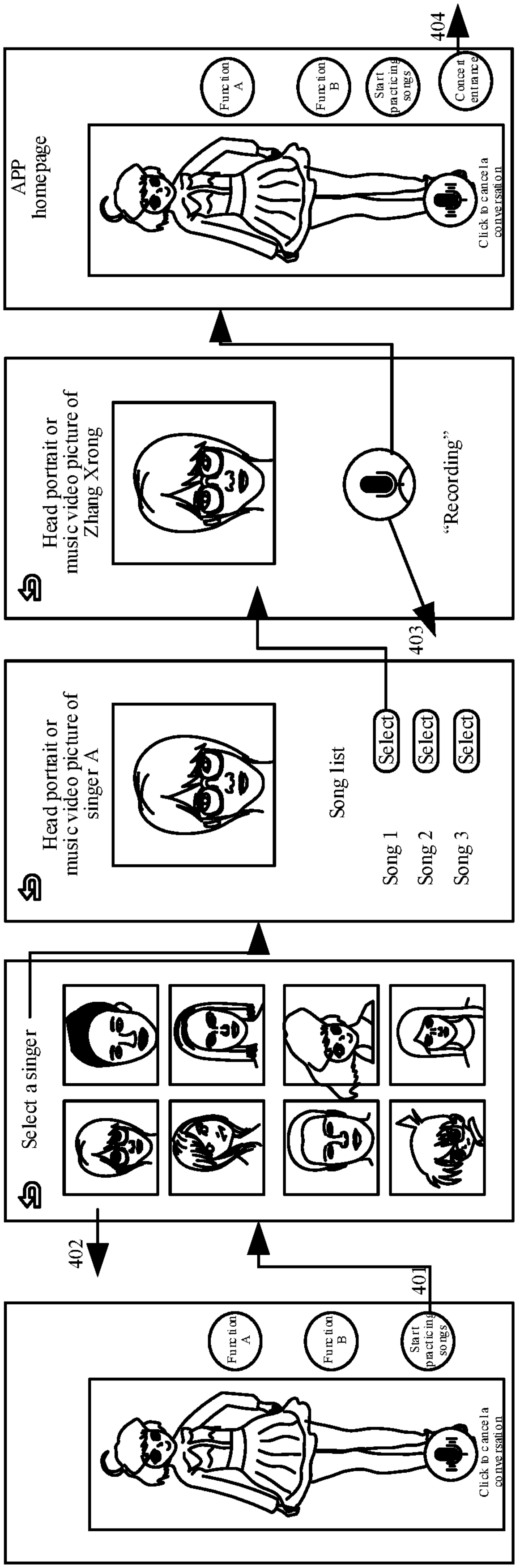
FIG. 4 is a schematic diagram of displaying of a concert entrance provided by an embodiment of this application.

Referring to FIG. 4, FIG. 4 is a schematic diagram of displaying of a concert entrance provided by an embodiment of this application. Firstly, the song practice entrance 401 for practicing songs is presented in the song practice interface, when the user triggers (such as clicking, double-clicking and sliding) the song practice entrance 401, the terminal presents the singer selection interface 402 in response to the trigger operation and presents a plurality of selectable candidate singers in the singer selection interface 402, when the user selects the target singer from the candidate singers, the terminal presents a plurality of candidate songs for practicing corresponding to the target singer in response to the selection operation, when the user selects the target song, the terminal presents the audio recording entrance 403 in response to the selection operation, when the user triggers the audio recording entrance 403, the terminal receives the song practice instruction for the target song in response to the trigger operation and collects the practice audio in singing practice of the current object for the song of the target singer in response to the song practice instruction, whether the current object has the creation qualification of creating the concert of the target singer is judged based on the practice audio, and the concert entrance 404 is presented in the song practice interface when it is determined that the current object has the creation qualification of creating the concert of the target singer.

Figure 5:
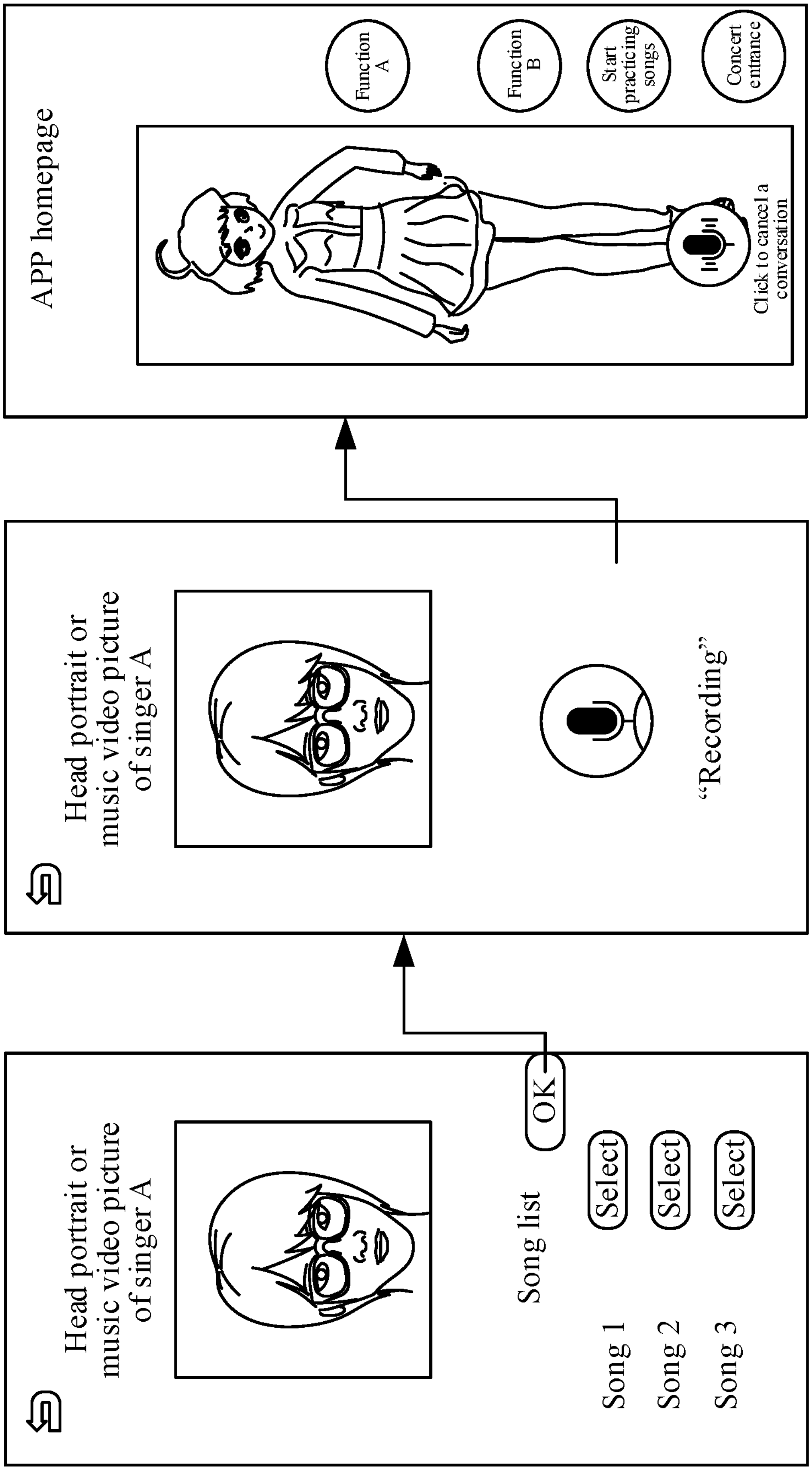
FIG. 5 is a schematic diagram of selection of a sung song provided by an embodiment of this application.

In some embodiments, the number of the target songs may be multiple (two, or two or more), for example, referring to FIG. 5, FIG. 5 is a schematic diagram of selection of a sung song provided by an embodiment of this application, as for the plurality of presented candidate songs for practice corresponding to the target singer, each candidate song is associated with a triggerable option, when the user triggers some options (such as 3 options), the terminal receives a trigger operation of the user for options (3 options) associated with the candidate songs (3 songs) to be practiced first, and then receives a selection operation for the target songs in response to a determining instruction for the selected options, at the moment, the target songs are the candidate songs (3 songs) corresponding to the selected options (3 options), the audio recording entrance is presented in response to the selection operation, the terminal receives the song practice instruction for the target songs (3 songs) in response to a trigger operation for the audio recording entrance and collects practice audios (practice audios corresponding to the 3 songs) in singing practice of the current object for the songs of the target singer one by one in response to the song practice instruction, whether the current object has the creation qualification of creating the concert of the target singer is judged based on the practice audios, and the concert entrance is presented in the song practice interface when it is determined that the current object has the creation qualification of creating the concert of the target singer. In this way, the plurality of songs are selected once for practice, which can improve the song practice efficiency.

In some embodiments, prior to presenting the concert entrance associated with the target singer in the song practice interface of the current object, whether the current object has the creation qualification of creating the concert of the target singer may further be judged in the following way: presenting a practice score obtained by scoring the practice audio; determining that the current object has the creation qualification of creating the concert of the target singer when the practice score reaches a target score; and determining that the current object does not have the creation qualification of creating the concert of the target singer when the practice score is lower than the target score, and presenting a re-practice entrance for the current object to re-practice the songs of the target singer at the moment.

Here, scoring the practice audio of the target song is described. During actual implementation, at least one of following singing parameters of the practice audio is obtained: intonation, rhythm, melody, rhyme, lyric and emotion. The singing parameters of the practice audio are compared with singing parameters of an original singing audio of the target song according to a singing time point to obtain a similarity, and the score of the practice audio is determined based on a magnitude of the similarity and a mapping relationship between the magnitude of the similarity and scores.

Figure 6:
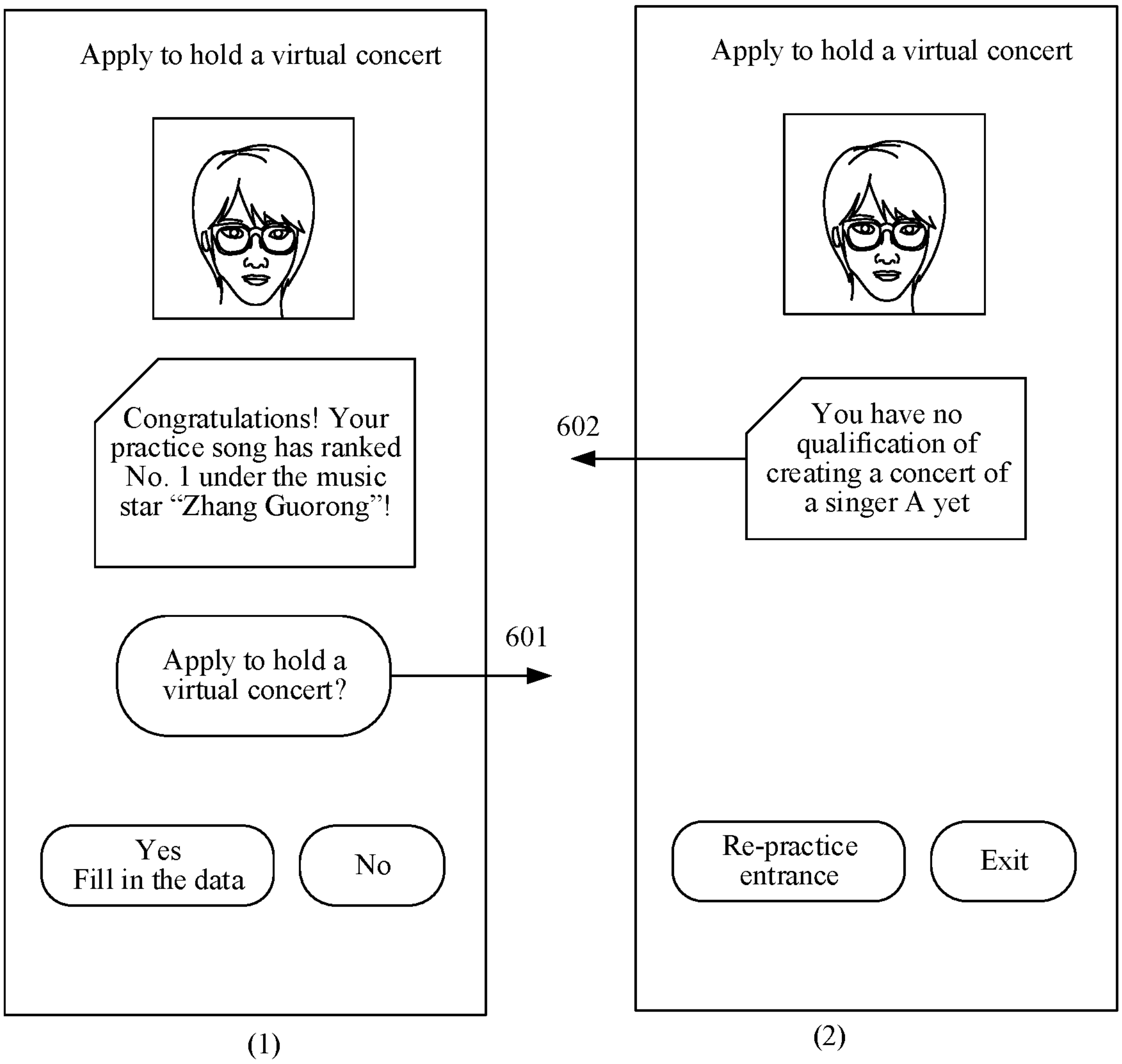
FIG. 6 is a schematic diagram of displaying of a practice result provided by an embodiment of this application.

Referring to FIG. 6, FIG. 6 is a schematic diagram of displaying of a practice result provided by an embodiment of this application. The practice score is presented in a practice result interface, whether the current object has the creation qualification of creating the concert of the target singer is determined by judging whether the practice score reaches a preset target score (100 is a full score, and the target score is set to be 95), for example, in (1), when the practice score (98) reaches the preset target score (95), prompt information 601 for prompting that the current object has the creation qualification of creating the concert of the target singer is presented; and for example, in (2), the practice score (80) is lower than the preset target score (95), then prompt information 602 for prompting that the current object does not have the creation qualification of creating the concert of the target singer as well as the re-practice entrance are presented, the current object may re-practice the song of the target singer through the re-practice entrance, through multiple times of practice, the current object may learn singing skills, timbres, tones and the like of the target singer, and the current object can have the creation qualification of creating the concert of the target singer only when the practice score is increased until reaching the target score.

In some embodiments, before the terminal presents the practice score of the practice audio, the practice score of the practice audio may be determined in the following way: presenting, when the number of the practiced songs is at least two, practice scores corresponding to practice audios of the current object for the songs; obtaining singing difficulties of the songs, and determining weights of the corresponding songs based on the singing difficulties; and weighting and averaging the practice scores of the practice audios of the songs based on the weights to obtain a practice score of the practice audios of the practiced songs of the current object.

The singing difficulties may be grades or difficulty coefficients of the songs, generally, the higher the grade of a song or the larger the difficulty coefficient of the song, the larger the singing difficulty, and the larger a corresponding weight, through the manner of weighting and averaging, comprehensive averaging calculation is performed on the practice scores of the plurality of target songs practiced by the current object to obtain the final practice score, a real singing level of the current object singing the songs of the target singer can be represented accurately, objective evaluation for the singing level of the current object is ensured, and the scientificity and reasonability of obtaining the practice score are improved.

In some embodiments, the practice score includes at least one of the following: a timbre score and an emotion score; and correspondingly, before the terminal presents the practice score corresponding to the practice audio, the practice score of the practice audio may be determined in the following way: performing timbre conversion on the practice audio when the practice score includes the timbre score, to obtain a practice timbre corresponding to the target singer, comparing the practice timbre with an original singing timbre of the target singer singing the song to obtain a corresponding timbre similarity, and determining the timbre score based on the timbre similarity; and performing emotion degree recognition on the practice audio when the practice score includes the emotion score, to obtain a corresponding practice emotion degree, comparing the practice emotion degree with an original singing emotion degree of the target singer singing the song to obtain a corresponding emotion similarity, and determining the emotion score based on the emotion similarity.

During timbre conversion, the practice audio of the current object is converted along the original singing timbre of the target singer to obtain the practice timbre relatively close to the timbre of the original target singer, and it may be understood that, although after timbre conversion, the converted practice timbre is just relatively close to the original singing timbre of the original singer instead of being completely the same, as different users have different singing levels, practice timbres obtained by converting practice audios of different users are not the same, the timbre similarities between the practice timbres of the different users and the original singing timbre are not the same, and thus the timbre scores are different.

In some embodiments, the terminal may perform timbre conversion on the practice audio to obtain the practice timbre corresponding to the target singer in the following way: performing phonemic recognition on the practice audio through a phonemic recognition model to obtain a corresponding phoneme sequence; performing sound loudness recognition on the practice audio to obtain a corresponding sound loudness feature; performing melody recognition on the practice audio to obtain a sine excitation signal for representing a melody; and performing fusing processing on the phoneme sequence, the sound loudness feature and the sine excitation signal through a sound wave synthesizer to obtain the practice timbre corresponding to the target singer.

Figure 18:
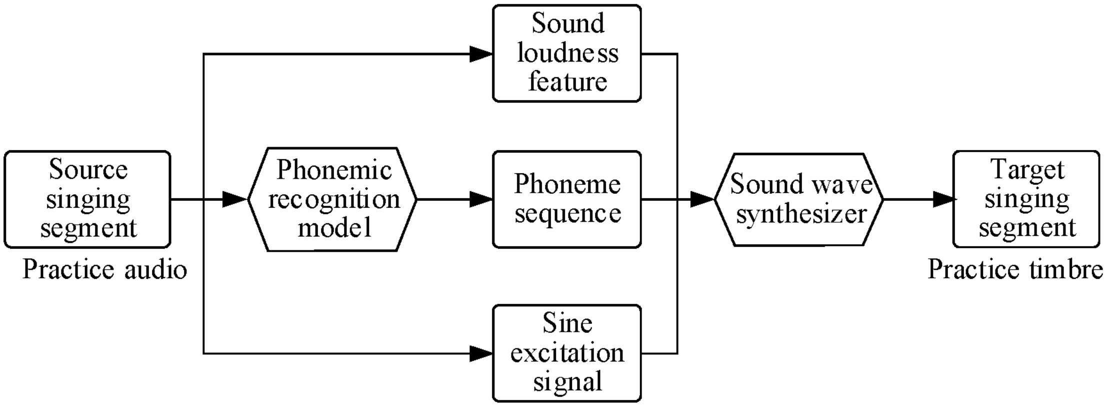
FIG. 18 is a schematic diagram of timbre conversion provided by an embodiment of this application.

As shown in FIG. 18, the phonemic recognition model is also called a PPG extractor, and is a part of an automatic speech recognition (ASR) model, the ASR model has a function of converting a speech to text, and its essence is converting the speech to a phoneme sequence first, the phoneme sequence being composed of a plurality of phonemes, and a phoneme referring to a minimum speech unit obtained by performing division according to a natural attribute of the speech; and then converting the phoneme sequence to the text, while the PPG extractor has a function of converting the speech to the phoneme sequence first, that is, it is used for extracting information irrelevant to the timbre from the practice audio, such as text content information.

Figure 19:
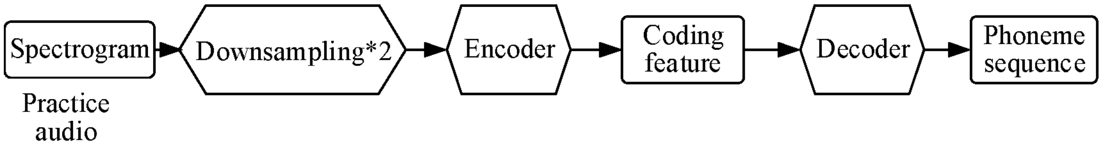
FIG. 19 is a schematic structural diagram of a phonemic recognition model provided by an embodiment of this application.

In practical applications, as shown in FIG. 19, considering that the practice audio is a chaotic wave signal on the time domain in practical applications, to facilitate analysis, the practice audio on the time domain may be converted to a frequency domain through fast Fourier transformation to obtain audio spectra corresponding to audio data, then difference degrees between the audio spectra corresponding to adjacent sampling windows are calculated based on the obtained audio spectra, then energy spectra corresponding to the sampling windows are determined based on the plurality of obtained difference degrees, and finally a spectrogram (such as a Mel spectrogram) corresponding to the practice audio is obtained; and afterwards, downsampling processing is performed on a downsampling layer of the spectrogram corresponding to the practice audio, where the downsampling layer is of a two-dimensional convolutional structure, downsampling processing is performed on the input spectrogram with a 2-times time scale to obtain a downsampling feature, then the downsampling feature is input to an encoder (may be an integration encoder or a transformer encoder) for encoding processing to obtain a corresponding encoding feature, and then the encoding feature is input to a decoder for decoding processing to predict the phoneme sequence of the practice audio, where the decoder may be a CTC decoder, the decoder includes a full connection layer, and a decoding process is as follows: a phoneme with a maximum probability is screened out from each frame of practice audio according to the encoding feature, a phoneme temporal sequence is constituted by the screened phoneme with the maximum probability corresponding to each frame of practice audio, and adjacent identical phonemes in the phoneme temporal sequence are combined to obtain the phoneme sequence.

The sound loudness feature is a time sequence of loudness of each frame of practice audio in the practice audio, namely a maximum amplitude corresponding to each frame of practice audio obtained after performing short-time Fourier transformation on the practice audio, where the sound loudness refers to the strength of a sound, loudness is the sound strength judged according to feelings of human ears, namely a degree of sound loudness, and the practice audio may be arranged as a sequence from quiet to loud according to the loudness. The sine excitation signal is obtained by calculation by using a base frequency of a sound (F0, a base frequency of each frame of sound is equivalent to a pitch of each frame of sound), and is used for representing a melody of an audio, where the melody usually refers to an organized and rhythmic sequence formed by a plurality of musical tones through artistic conceptions, and is carried out according to a monophonic part which is composed of a certain pitch, duration and volume and has a logic factor, and the melody is formed by organically combining many basic elements of music, such as a mode, a rhythm, a meter, strength, a timbre, a performance method and the like. The sound wave synthesizer aims to synthesize three features irrelevant to the timbre of a speaker: the phoneme sequence, the sound loudness feature and the sine excitation signal of the practice audio, to form sound waves of singing which is sung by using the timbre of the target singer (i.e., the above practice timbre corresponding to the target singer).

In practical applications, the above sound waves of the singing which is sung by using the timbre of the target singer (i.e., the above practice timbre corresponding to the target singer) synthesized from the practice audio of the user may further be provided to the user for enjoying or sharing or the like by the user, and the user may further know a sound changing effect based on the obtained practice timbre corresponding to the target singer so as to determine which singing parts have improvement space, so that singing skills, timbres, tones and the like of the target singer (original singer) are learned, the own singing technology level is continuously optimized step by step to make the singing skills and singing manners closer and closer to the original singer, and the purpose of increasing the practice score until the creation qualification of creating the concert of the target singer is finally obtained is achieved.

In some embodiments, before the terminal presents the practice score corresponding to the practice audio, the practice score of the practice audio may be determined in the following way: transmitting the practice audio to terminals of other objects to make the terminals of the other objects obtain manual scores corresponding to the inputted practice audio based on a scoring entrance corresponding to the practice audio; and receiving the manual scores returned by the terminals, and determining the practice score corresponding to the practice audio based on the manual scores.

Figure 7:
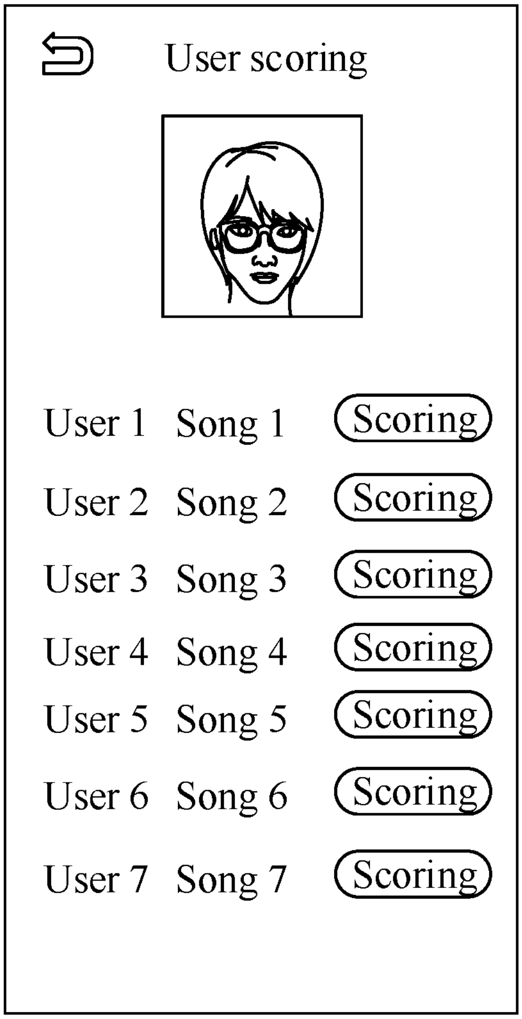
FIG. 7 is a schematic diagram of scoring of a practice audio provided by an embodiment of this application.

Here, the practice audio to be scored is put into a voting pool corresponding to the target singer so as to push the practice audio to the terminals of the other objects, and the other objects may score the practice audio of the current object through the scoring entrance presented by their terminals. Referring to FIG. 7, FIG. 7 is a schematic diagram of scoring of the practice audio provided by an embodiment of this application. The scoring entrance for scoring the practice audio of the practiced song of the target singer is presented in a user scoring interface, the practice audio to be scored is scored through the scoring entrance to obtain the manual score, and the manual scores returned by the terminals of the other objects are used as the practice score corresponding to the practice audio.

In practical applications, when the manual scores are determined, attributes (such as identities and grades) of the objects participating in manual scoring may further be considered, and weights of corresponding scores are determined based on the attributes of the objects, for example, the identities of the objects participating in manual scoring include: a music professional, media personnel, general public and the like, where the objects with different identities correspond to different weights of the manual scores. For another example, the singing grades of the objects participating in manual scoring include 0 to 5 grades, the objects with different grades may also correspond to different weights of manual scoring, and after the score of each object for the practice audio is obtained, weighting and averaging are performed on the scores based on the weights of the objects to obtain the practice score of the practice audio. Therefore, the obtained practice score can accurately represent a real singing level of the current object singing the songs of the target singer, objective evaluation for the singing level of the current object is ensured, and the scientificity and reasonability of obtaining the practice score are improved.

In some embodiments, the terminal may transmit the practice audio to the terminals of the other objects in the following way: obtaining machine scores corresponding to the practice audio, and transmitting the practice audio to the terminals of the other objects when the machine scores reach a scoring threshold value; and correspondingly, the terminal may determine the practice score of the practice audio based on the manual scores in the following way: performing averaging processing on the machine scores and the manual scores to obtain the practice score corresponding to the practice audio.

Here, machine scoring may be performed on the practice audio through artificial intelligence first to obtain a corresponding machine score, when the machine score reaches a preset scoring threshold value (if 100 is a full score, the scoring threshold value may be set to be 80), the practice audio is placed into a voting pool corresponding to the target singer so as to push the practice audio to the terminals of the other objects, the other objects may score the practice audio of the current object through scoring entrances presented by the terminals thereof to obtain the manual scores corresponding to the practice audio, and the practice score corresponding to the practice audio is obtained by combining the machine scores and the manual scores, for example, averaging processing is performed on the machine scores and the manual scores to obtain the practice score corresponding to the practice audio. Therefore, the accuracy of the practice score obtained by combining the machine scores and the manual scores is improved, the practice score with the high accuracy can accurately represent a real singing level of the current object singing the songs of the target singer, objective evaluation for the singing level of the current object is ensured, and the scientificity and reasonability of obtaining the practice score are improved.

In some embodiments, prior to presenting, by the terminal, the concert entrance associated with the target singer in the song practice interface corresponding to the current object, whether the current object has the creation qualification of creating the concert of the target singer may further be judged in the following way: presenting a song practice rank of the current object corresponding to the practiced song; and determining that the current object has the creation qualification of creating the concert of the target singer when the song practice rank is before a target rank. Therefore, only users with top ranks have the qualification to create or hold the virtual concert of the target singer, which ensures that the users creating or holding the virtual concert have high singing levels, and guarantees the quality of the concert.

Figure 8:
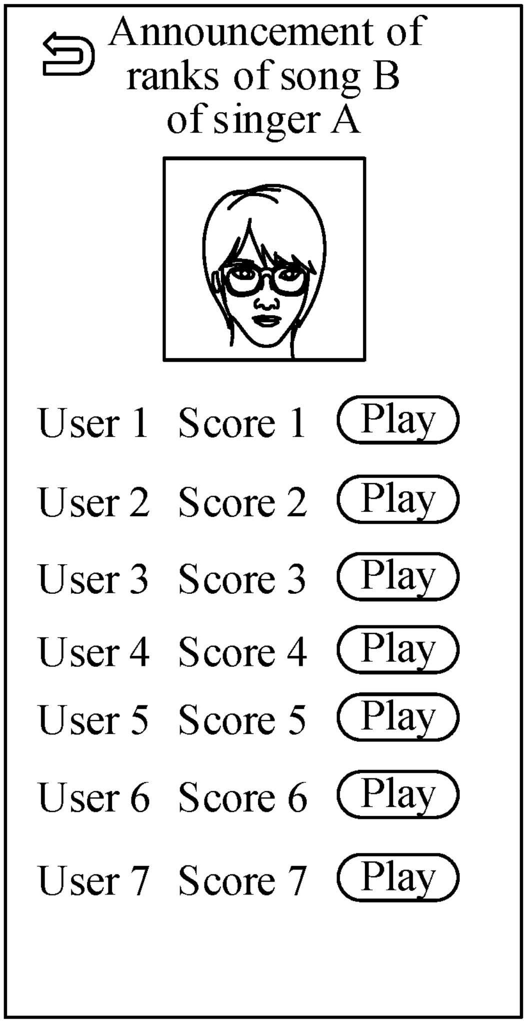
FIG. 8 is a schematic diagram of song practice ranks provided by an embodiment of this application.

In practical applications, the practice audio based on the practiced song may further be presented in the song practice interface, the song practice rank of the current object corresponding to the practiced song is determined, the song practice rank is determined based on the practice score of the practice audio, for instance, descending song practice ranks are determined according to a sequence from high to low of the practice scores of users who practice for the target singer, for example, referring to FIG. 8, FIG. 8 is a schematic diagram of song practice ranks provided by an embodiment of this application, when a plurality of users practice the song B of the singer A, descending song practice ranks are presented, it is determined that the current objects have the creation qualifications of creating the concert of the singer A only when the song practice ranks of the current objects are located before a target rank (e.g., No. 4), that is, top 3 users have the creation qualifications of creating the concert of the singer A, and if the song practice rank of the current object is the target rank (No. 4) or located behind the target rank, then it is determined that the current object does not have the creation qualification of creating the concert of the singer A. In addition, a playing entrance may further be presented in the song practice interface, and practice audios of corresponding users who practice the song B may be played through the playing entrance.

In some embodiments, the terminal may further present, when the number of the practiced songs of the current object is at least two, a total score of the current object singing all the songs and a detail entrance for viewing details; and a detail page is presented in response to a trigger operation for the detail entrance, and practice scores corresponding to the songs are presented in the detail page.

The detail page may be displayed in the form of a pop-up window, and may also be displayed in the form of a sub-interface independent of the song practice interface, and the displaying form of the detail page is not limited in this embodiment of this application.

Figure 9:
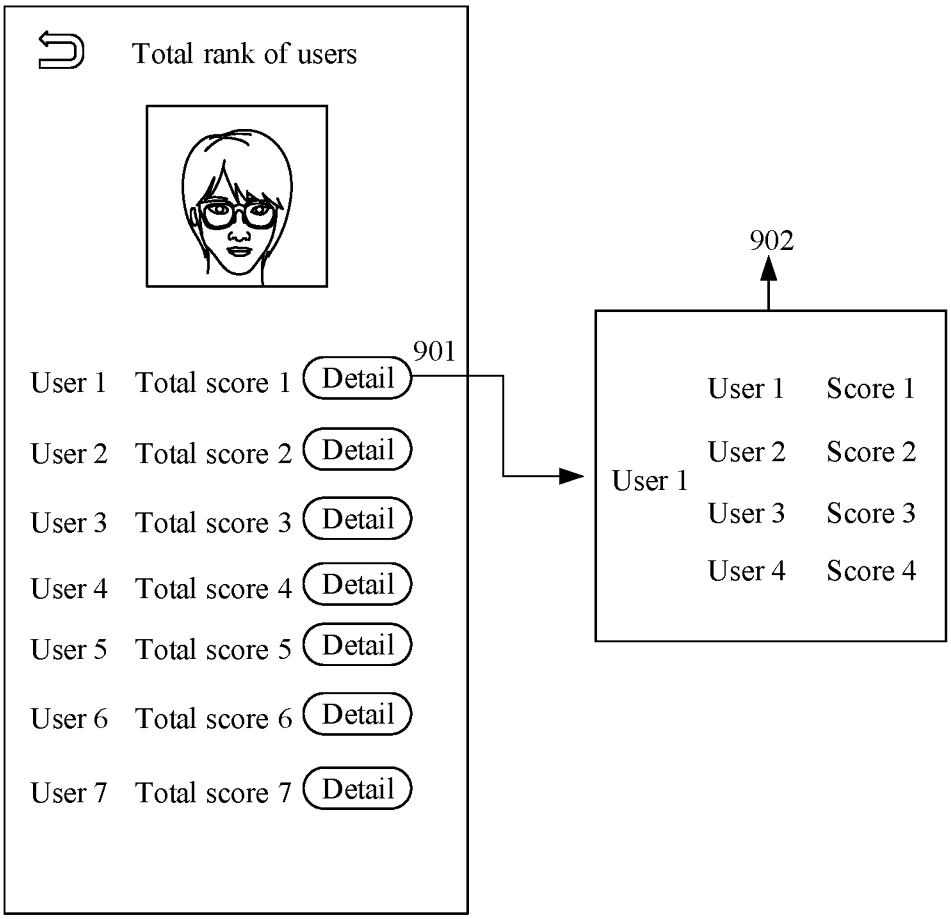
FIG. 9 is a schematic diagram of song practice ranks provided by an embodiment of this application.

Referring to FIG. 9, FIG. 9 is a schematic diagram of song practice ranks provided by an embodiment of this application. When the number of songs practiced by each object is multiple, a total score of all the songs sung by each object and the detail entrance for viewing details may further be presented when the descending song practice ranks are presented, for example, when the current object triggers (such as clicking, double-clicking and sliding) the detail entrance 901 of a user A, the terminal presents the detail page 902 in the form of a pop-up window in response to the trigger operation and presents all songs practiced by the user A in the detail page 902, such as a song 1, a song 2, a song 3 and a song 4, as well as practice scores corresponding to the songs. Therefore, the user may enjoy or share the songs sung by each object and the singing levels from the page and then have more comprehensive acknowledgment for own singing level and optimization direction, which is conducive to realizing gradual and continuous optimization of own singing level, and makes singing skills and singing manners closer and closer to the original singer, thereby achieving the purpose of increasing the practice score until reaching the creation qualification of creating the concert of the target singer.

Step 102: Receive a concert creation instruction for the target singer based on the concert entrance.

In practical applications, as for the situation that the concert entrance associated with the target singer is presented only when it is determined that the current object has the creation qualification of creating the concert of the target singer, as long as the current object triggers (such as clicking, double-clicking and sliding) the concert entrance, the terminal may receive the concert creation instruction for the target singer in response to the trigger operation to create, based on the concert creation instruction, the concert room for simulating singing the songs of the target singer. As for the situation that the concert entrance is presented in the song practice interface all the time regardless of whether the current object has the creation qualification of creating the concert of the target singer, in response to the trigger operation for the concert entrance, the terminal needs to judge whether the current object has the creation qualification of creating the concert of the target singer first, and the concert creation instruction corresponding to the target singer is received only when the current object has the creation qualification of creating the concert of the target singer; otherwise, when the current object does not have the creation qualification of creating the concert of the target singer, the concert creation instruction for the target singer cannot be triggered even if the concert entrance is triggered currently.

In some embodiments, the terminal may receive the concert creation instruction for the target singer based on the concert entrance in the following way: presenting a singer selection interface in response to a trigger operation for the concert entrance, the singer selection interface including at least one candidate singer; and receiving the concert creation instruction for the target singer when determining that the current object has the creation qualification of creating the concert of the target singer in response to a selection operation for the target singer in the at least one candidate singer.

Figure 10:
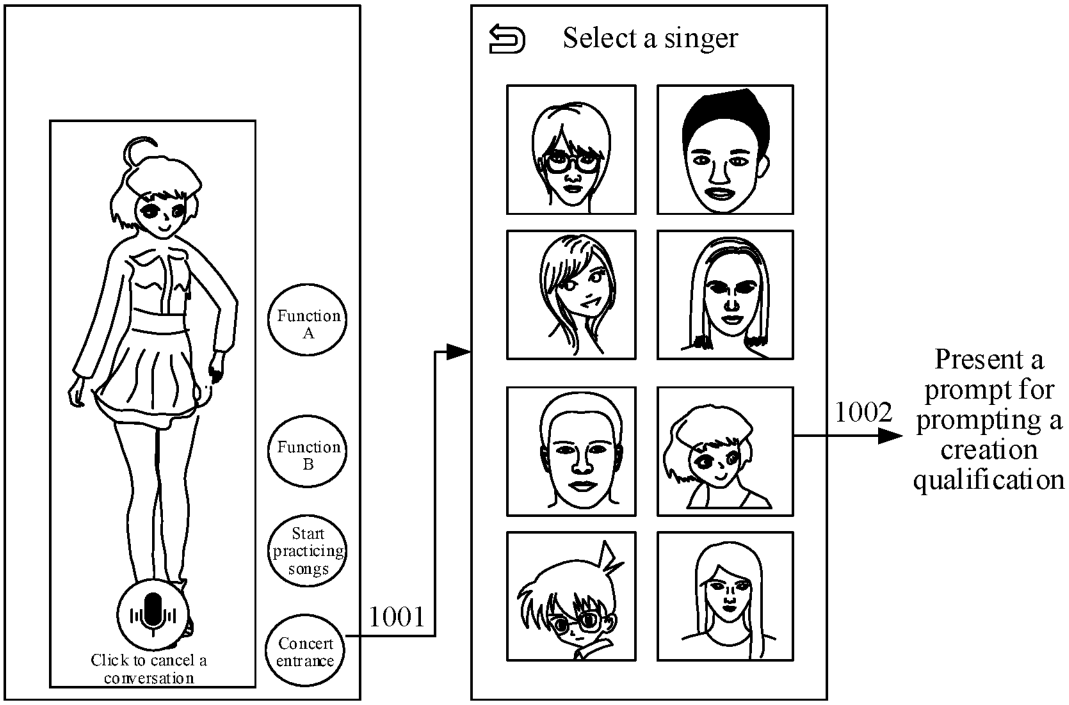
FIG. 10 is a schematic diagram of trigger of a concert creation instruction provided by an embodiment of this application.

Referring to FIG. 10, FIG. 10 is a schematic diagram of trigger of the concert creation instruction provided by an embodiment of this application. The concert entrance 1001 is a general entrance for creating a concert of each singer, when the current object triggers the concert entrance 1001, the terminal, in response to the trigger operation, presents the singer selection interface 1002 and presents at least one candidate singer selectable for the current object in the singer selection interface, when the current object selects the target singer 1002 from the candidate singers, the terminal, in response to the selection operation, judges whether the current object has the creation qualification of creating the concert of the target singer and presents a prompt for prompting whether the current object has the creation qualification, and when the current object has the creation qualification of creating the concert of the target singer, the terminal presents a prompt of having the creation qualification and receives the concert creation instruction for the target singer; otherwise, when the current object does not have the creation qualification of creating the concert of the target singer, a prompt of not having the creation qualification is presented, and the concert creation instruction for the target singer cannot be triggered even if the concert entrance is triggered currently. Therefore, only a user having the creation qualification of creating the concert of the target singer can create the virtual concert of the target singer, so that the quality of the concert is guaranteed.

In some embodiments, the terminal may receive the concert creation instruction corresponding to the target singer based on the concert entrance in the following way: presenting a singer selection interface in response to a trigger operation for the concert entrance, the singer selection interface including at least one candidate singer, and the current object having a creation qualification of creating concerts of the candidate singers; and receiving the concert creation instruction for the target singer in response to a selection operation for the target singer in the at least one candidate singer.

In practical applications, the current object may have a creation qualification of creating concerts of a plurality of singers, for example, the current object has a creation qualification of creating the concert of the singer A and the concert of the singer B at the same time, in this case, the concert entrance is a general entrance for creating concerts of all the singers where the creation qualification is owned, that is, the terminal of the current object may create the concert of the singer A and also the concert of the singer B through the concert entrance, and the current object may select the concert of the target singer to be held this time from the concerts.

Figure 11:
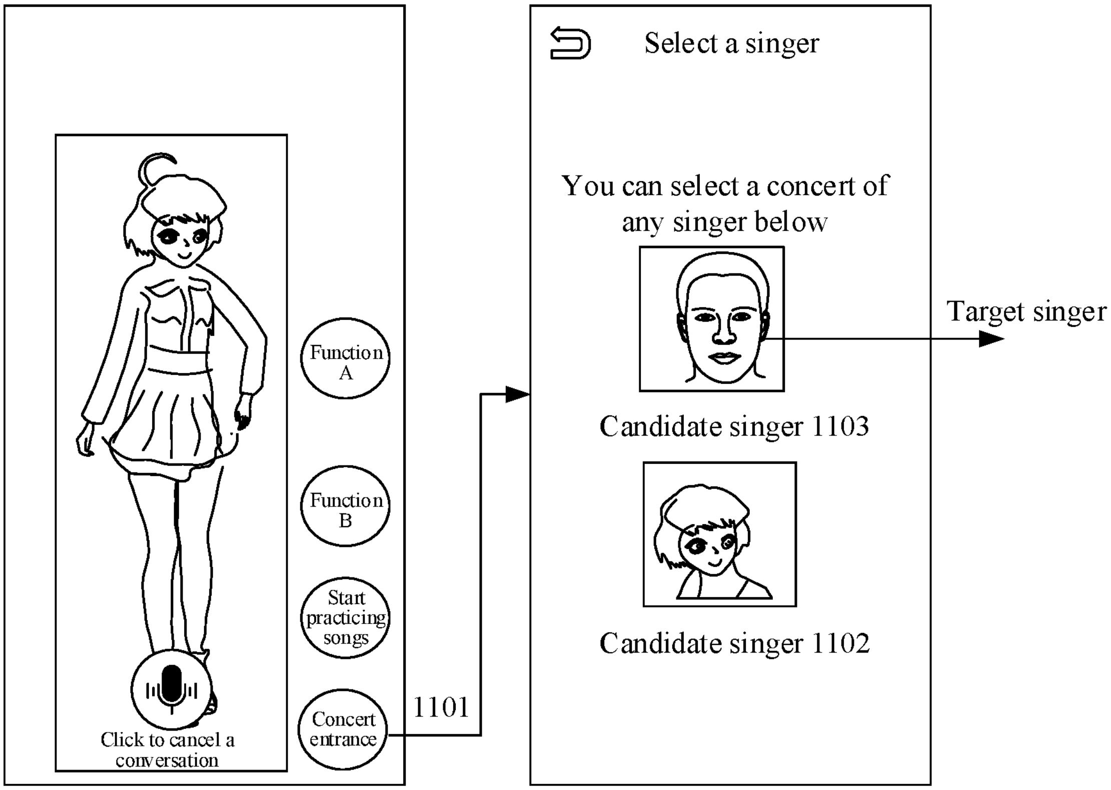
FIG. 11 is a schematic diagram of trigger of a concert creation instruction provided by an embodiment of this application.

Referring to FIG. 11, FIG. 11 is a schematic diagram of trigger of the concert creation instruction provided by an embodiment of this application. When the current object triggers the concert entrance 1101, the terminal, in response to the trigger operation, presents the singer selection interface and presents a candidate singer 1102 and a candidate singer 1103 selectable for the current object in the singer selection interface, where the current object has the creation qualification of creating a concert of the candidate singer 1102 and a concert of the candidate singer 1103 at the same time, and when the current object selects the candidate singer 1103 therefrom, the terminal, in response to the selection operation, uses the candidate singer 1103 as the target singer and receives a concert creation instruction for the target singer (i.e., the candidate singer 1103).

In some embodiments, when the number of the concert entrance is at least one, the concert entrance is associated with a singer, and the concert entrance has a corresponding relationship with the associated singer. The terminal may receive the concert creation instruction corresponding to the target singer based on the concert entrance in the following way: receiving the concert creation instruction corresponding to the target singer in response to a trigger operation for the concert entrance associated with the target singer.

Figure 12:
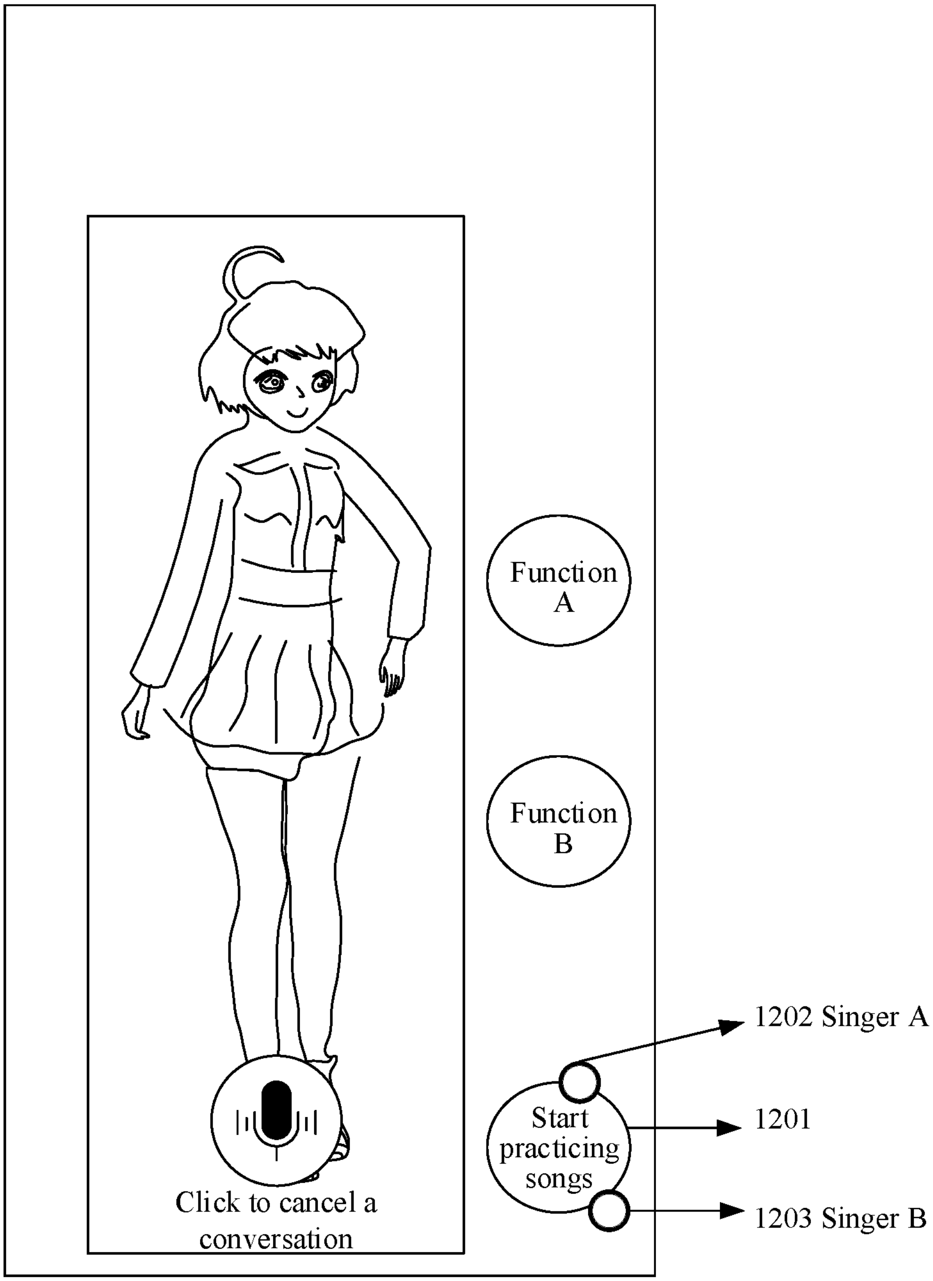
FIG. 12 is a schematic diagram of trigger of a concert creation instruction provided by an embodiment of this application.

Here, the number of the concert entrances presented in the song practice interface may be one or more (i.e., two, or two or more), each concert entrance is associated with a singer corresponding to a created concert, and the concert entrances and the singers associated with the concert entrances are in a one-to-one corresponding relationship. As shown in FIG. 12, FIG. 12 is a schematic diagram of trigger of the concert creation instruction provided by an embodiment of this application. Two concert entrances are presented in an associated region of the song practice entrance 1201 "start practicing songs", namely the concert entrance 1202 and the concert entrance 1203, where the concert entrance 1202 is associated with the singer A, the concert entrance 1203 is associated with the singer B, that is, the current object has the creation qualification of creating the concert of the singer A and the concert of the singer B at the same time, where the concert entrance 1202 is used for creating the concert of the singer A, the concert entrance 1203 is used for creating the concert of the singer B, and the current object may select the concert entrance corresponding to the concert of the target singer to be held this time therefrom, for example, when the current user triggers the concert entrance 1203, the terminal, in response to the trigger operation, uses the candidate singer B as the target singer, and receives the concert creation instruction for the target singer (i.e., the candidate singer B).

In some embodiments, the terminal may receive the concert creation instruction for the target singer based on the concert entrance in the following way: presenting prompt information for prompting whether to apply to create the concert corresponding to the target singer in response to a trigger operation for the concert entrance when the concert entrance is associated with the target singer; and receiving the concert creation instruction for the target singer when a determining operation for the prompt information is received.

Here, the concert entrance being associated with the target singer represents that the current object has the creation qualification of creating the concert of the target singer, when the current object triggers the concert entrance, the terminal, in response to the trigger operation, presents the prompt information for prompting whether to apply to create the concert corresponding to the target singer, the current object may decide whether to create the concert corresponding to the target singer based on the prompt information, for example, when the current object decides to create the concert corresponding to the target singer, the determining operation may be triggered by triggering a corresponding determining button, and when the terminal receives the determining operation, the terminal may receive the concert creation instruction corresponding to the target singer; otherwise, when the current object decides not to create the concert corresponding to the target singer, a canceling operation may be triggered by triggering a corresponding canceling button, when the terminal receives the canceling operation, the terminal will not receive the concert creation instruction for the target singer, at the moment, the song practice entrance may be presented in the song practice interface, and the current object may practice the songs of the target singer or songs of other singers through the song practice entrance so as to gradually and continuously optimize own singing technological level and make singing skills and singing manners closer and closer to the original singer, thereby achieving the purpose of increasing the practice score until reaching the creation qualification of creating the concert of the target singer.

In some embodiments, the terminal may receive the concert creation instruction corresponding to the target singer when the determining operation for the prompt information is received in the following way: presenting an application interface for applying creation of the concert of the target singer when the determining operation for the prompt information is received, and presenting an editing entrance for editing information related to the concert in the application interface; receiving the concert information edited based on the editing entrance; and receiving the concert creation instruction for the target singer in response to a determining operation for the concert information.

Figure 13:
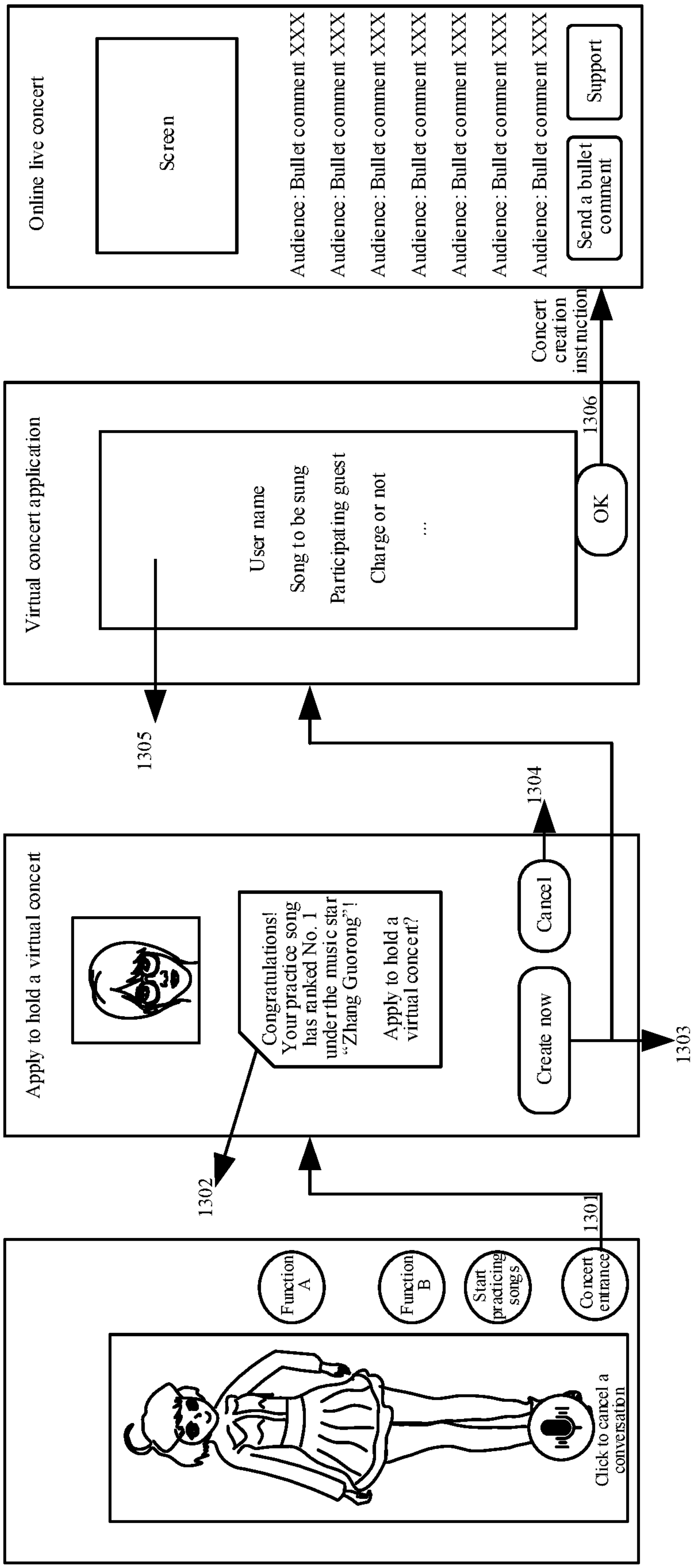
FIG. 13 is a schematic diagram of trigger of a concert creation instruction provided by an embodiment of this application.

Referring to FIG. 13, FIG. 13 is a schematic diagram of trigger of the concert creation instruction provided by an embodiment of this application. The terminal, in response to a trigger operation for the concert entrance 1301, presents the prompt information 1302 such as "Congratulations! Your practice song has ranked the first under the singer A, apply for a virtual concert of the singer A?" as well as an instant creating button 1303 for creating the concert room instantly and the canceling button 1304, when the user triggers the instant creating button 1303, the terminal receives a determining operation for the prompt information, presents the application interface 1305 in response to the determining operation and presents the editing entrance in the application interface, the information related to the created concert is edited through the editing entrance, such as a user name, a to-be-sung song, a participating guest, a concert duration, whether to charge or not and other concert information, a determining button 1306 corresponding to the concert information is also presented, and the terminal, in response to a trigger operation for the determining button 1306, receives the determining operation for the concert information and receives the concert creation instruction for the singer A in response to the determining operation.

In addition, propaganda information related to the concert may further be edited through the editing entrance, such as a concert introduction and concert start time, and the terminal, in response to a determining operation for the propaganda information, generates a propaganda poster or a propaganda applet or the like carrying the propaganda information and shares the propaganda poster or the propaganda applet to the terminals of the other objects so as to widely propagate and popularize the concert corresponding to the target singer held by the current object, so that the terminals of the other objects enter the concert room created by the current object to attract more users to view the online virtual concert created by the current object online, the created virtual concert is made to cover more populations, then more users are driven to practice singing songs of the target singer or other singers, and the user retention rate can be increased.

In some embodiments, the concert room may further be created in an appointed mode, and the terminal may receive the concert creation instruction corresponding to the target singer based on the concert entrance in the following way: presenting an appointment entrance for appointing creation of the concert room; presenting an appointment interface for appointing creation of the concert of the target singer in response to a trigger operation for the appointment entrance, and presenting an editing entrance for editing concert appointment information in the appointment interface; receiving the concert appointment information edited based on the editing entrance, the concert appointment information at least including a concert start time point; and receiving the concert creation instruction for the target singer in response to a determining operation for the concert appointment information.

Figure 14:
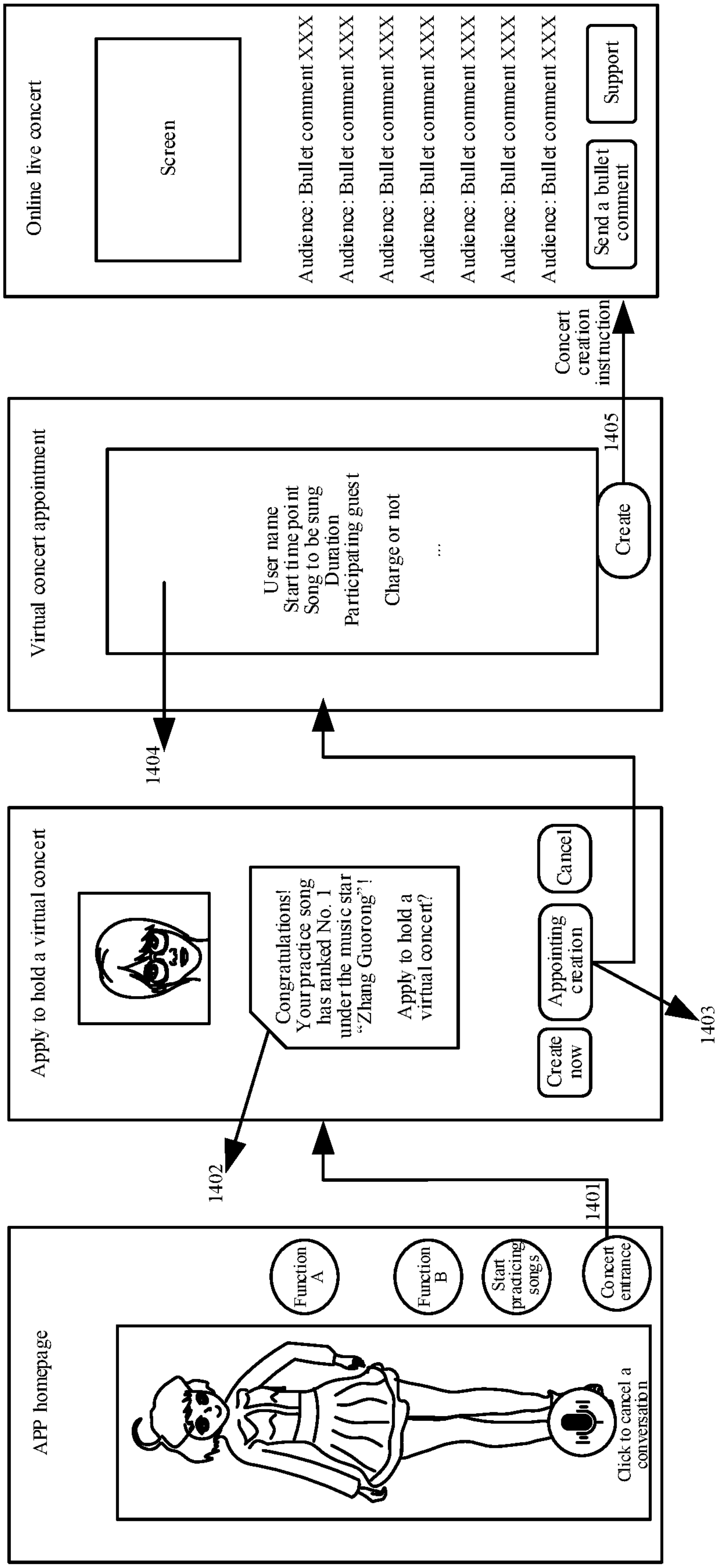
FIG. 14 is a schematic diagram of trigger of a concert creation instruction provided by an embodiment of this application.

Referring to FIG. 14, FIG. 14 is a schematic diagram of trigger of the concert creation instruction provided by an embodiment of this application. The terminal, in response to the trigger operation for the concert entrance 1401, presents the prompt information 1402 such as "Congratulations! Your practice song has ranked the first under the singer A, apply for a virtual concert of the singer A?" and presents the appointment entrance 1403 for appointing creation of the concert room, and presents, in response to the trigger operation for the appointment entrance 1403, the appointment interface 1404 of the concert room, and a concert introduction, a concert start time point, a concert duration or more other information may be set in the appointment interface, where the concert start time point may be determined based on a time point selected by an appointment time option and may also be determined based on time recommended by a system; and after the setting is completed, the current object triggers an appointment determining button 1405 "create", the determining operation for the concert appointment information is received, and the concert creation instruction for the singer A is received in response to the determining operation.

Step 103: Create the concert room for simulating singing the song of the target singer in response to the concert creation instruction.

The concert room refers to a network live program opened by the current object, and is used for the current object to sing the song of the target singer by simulating the target singer, that is, the current object sings the song of the target singer in the concert room as an anchor and live-broadcasts the singing content to audiences in real time for enjoying, and the audiences may view the singing content live-broadcast by the current object through a concert interface displayed by a web page or the concert room displayed by the client, that is, users entering the concert room or users browsing the concert interface in the live-broadcast web page can view the singing content of the song of the target singer sung by the current object in the concert room. In practical applications, the concert room may be created instantly or in the appointed mode, as for instant creation, as shown in FIG. 13, the terminal, in response to the concert creation instruction, generates and sends a creation request to a server (i.e., a background server of the client), and the server creates the corresponding concert room based on the creation request and returns a room identification of the concert room to the terminal, so that the terminal enters and presents the created concert room based on the room identification. As for appointed creation, as shown in FIG. 14, the terminal, in response to the concert creation instruction, generates and sends a creation request carrying the concert appointment information to the server, the server creates the corresponding concert room based on the creation request and returns a room identification of the concert room to the terminal, and when a live-broadcast start time point is reached, the terminal enters and presents the created concert room based on the room identification.

In practical applications, after the concert room is created, the terminal of the current object may further share a room identification of the concert room, concert information or concert appointment information to the terminals of the other objects so as to widely propagate and popularize the concert corresponding to the target singer about to be held by the current object, so that the terminals of the other objects enter the concert room created by the current object based on the room identification to attract more users to view the online virtual concert created by the current object online, the created virtual concert is made to cover more populations, then more users are driven to practice singing songs of the target singer or other singers, and the user retention rate can be increased.

Step 104: Collect a singing content of the song of the target singer in simulated singing of the current object, and play the singing content through the concert room.

The singing content is used for being played by the terminals corresponding to the objects in the concert room through the concert room, the singing content includes an audio content of singing of the song of the target singer, and the audio content may be obtained in the following way: collecting a singing audio of singing performed by the current object on the song of the target singer; and performing timbre conversion on the singing audio to obtain a converted audio, corresponding to a timbre of the target singer, of the singing audio, and using the converted audio as the audio content in the singing content.

In practical applications, holding of the virtual concert requires pseudo-real-time singing conversion using a speech conversion service, for example, when the current object sings songs in the concert room, a source audio stream of singing is collected in real time through a hardware microphone, the collected source audio stream is transmitted into the speech conversion service in a queue form, after the source audio stream is subjected to speech conversion (such as timbre conversion) through the speech conversion service, a converted target audio stream is still outputted to a virtual microphone in the concert room with a uniform speed in the queue form, and the target audio stream is played in a live-broadcast manner in the concert room through the virtual microphone to achieve the purpose of playing the singing content.

For example, the current object holds the virtual concert of the singer A, when the songs of the singer A are sung in a simulated mode, the terminal collects a singing audio (source audio stream) of the songs sung by the current object, performs timbre conversion on the singing audio to obtain a converted audio (target audio stream) corresponding to the timbre of the singer A, and plays the converted audio through the concert room, and therefore, other users hear a sound which is relatively close to or nearly the same as the timbre of the singer A, thereby achieving reproduced performance of the concert of the target singer.

In addition, the singing content may further include a picture content in addition to the singing audio (sound), and as shown in FIG. 13 or FIG. 14, when the current object sings the songs of the target singer in the concert room, the relevant singing content is played through the concert room, for example, in addition to playing the singing of the current object singing the songs, a virtual stage, virtual audiences, a virtual background and the like are further presented, where a virtual human image corresponding to the target singer may be presented in the virtual stage, or a real image of the current object or a virtual human image corresponding to the current object may be presented; the virtual audiences are used for representing other objects entering the concert room to view the concert, and may be displayed in the form of virtual human images; and the virtual background may be a picture related to a currently sung song, such as a singing picture of the target singer singing the current song in the past (a picture in an MV or a picture of a real concert), or a real picture of the current object currently singing the song.

Figure 15:
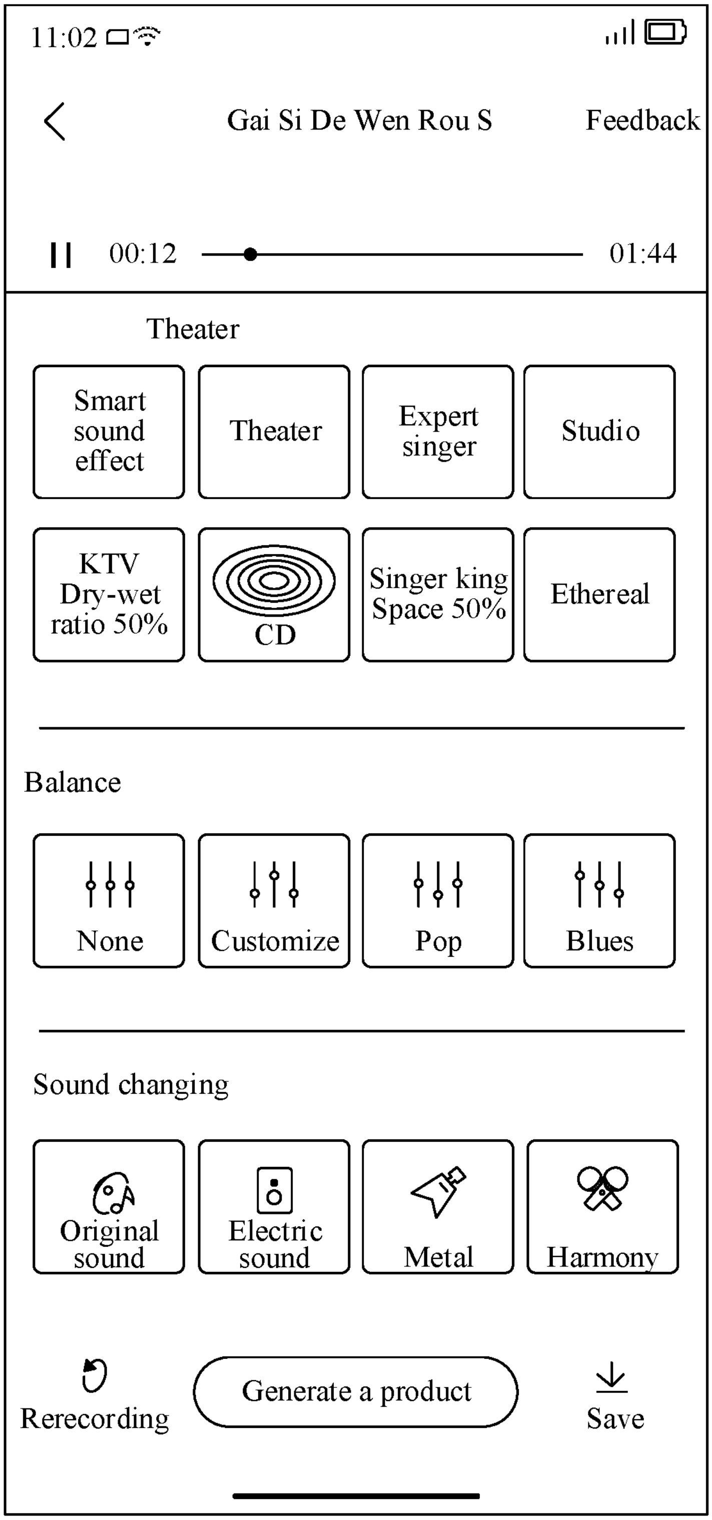
FIG. 15 is a schematic diagram of singing sound changing provided by an embodiment of this application.

In some embodiments, in the process of playing the singing content by the terminal through the concert room, interaction information of other objects for the singing content may further be presented in the concert room, as shown in FIG. 15, in addition to playing the relevant singing content through the concert room, interaction information of other objects entering the concert room for the current singing content may further be presented, such as issued bullet comment information and likes, it is conducive to better transferring emotions for the target singer while contents played in the concert are enriched, more entertainment choices are provided to users, and the increasing diversified requirements for user information are met.

It may be understood that when this embodiment of this application is applied to a specific product or technology, the user information involved in this embodiment of this application, such as the practice audio of the current object, the concert-related information (e.g., the concert identification, the singing content and the like) or the interaction information of other objects and other related data, needs to obtain permissions or agreements of the users, and collection, use and processing of the related data need to comply with relevant laws, regulations, and standards of relevant countries and regions.

In the following, an exemplary application of this embodiment of this application in an actual application scenario will be described. Referring to FIG. 15, FIG. 15 is a schematic diagram of singing sound changing provided by an embodiment of this application. In the related art, a user performs reverberation and various personalized sound changing processing after recording a song, so that a user who is not able to sing may also participate in recording, issuing, sharing and the like happily. However, only four sound changing functions are supported in the related art: original sound, electronic sound, metal and harmony, the functions are fixed, the sound changing effect is limited, only direct sound changing is available, algorithm verification and user verification cannot be performed subsequently, the sound changing effect cannot be known, and continuous optimization is not enabled; besides, the above sound changing functions can only be used for users for simple and random singing, and the users cannot create or hold virtual concerts of specific singers. Besides, the related art is based on a speech conversion technology of a cycle generative adversarial network (CycleGAN), the cycle generative adversarial network includes two generators and two arbiters, in a speech conversion scenario, the two generators are responsible for converting a speaker A to a speaker B and converting the speaker B to the speaker A respectively, it can be seen that the two arbiters are responsible for judging whether a speech is a speech of the speaker A and whether a speech is a speech of the speaker B respectively, adversarial training may be performed by circularly splicing the two generators and connecting the corresponding arbiters, but this network architecture is only available for one-to-one speech conversion and cannot convert a speech of any speaker to a certain specific speaker.

To this end, an embodiment of this application provides a method for processing a virtual concert, based on a many-to-one speech conversion technology, a virtual concert for a specific target singer can be held or created, which realizes reproduced performance of a concert of the target singer, and this exhibition and performance manner facilitates better transfer of emotions for the target singer, provides more entertainment choices for users and meets the increasing diversified requirements for user information.

Figure 16:
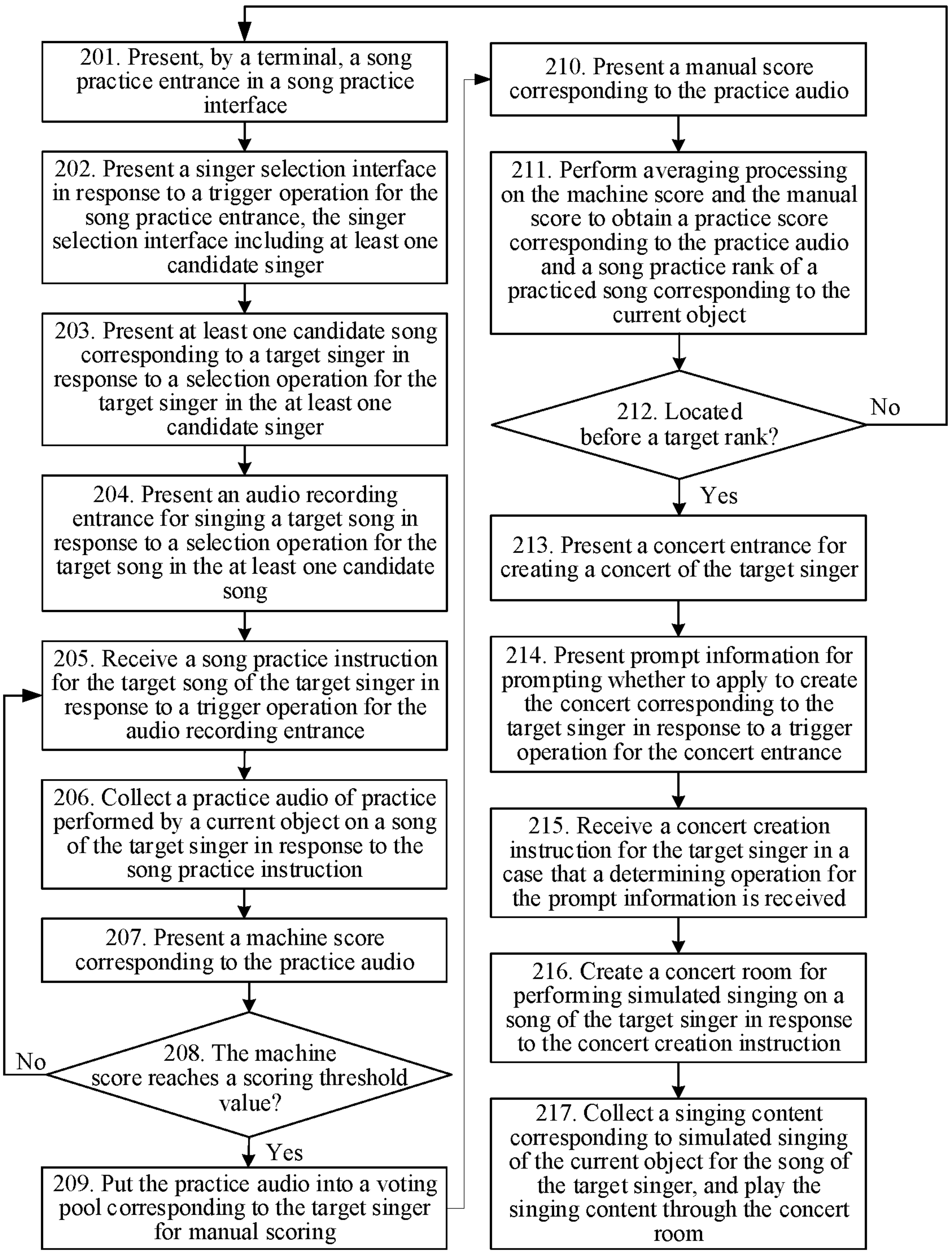
FIG. 16 is a schematic flowchart of a method for processing a virtual concert provided by an embodiment of this application.

Referring to FIG. 16, FIG. 16 is a schematic flowchart of a method for processing a virtual concert provided by an embodiment of this application. The method for processing the virtual concert provided by this embodiment of this application involves the following steps:

Step 201: Present, by a terminal, a song practice entrance in a song practice interface.

Step 202: Present a singer selection interface in response to a trigger operation for the song practice entrance, the singer selection interface including at least one candidate singer.

Step 203: Present at least one candidate song corresponding to a target singer in response to a selection operation for the target singer in the at least one candidate singer.

Step 204: Present an audio recording entrance for singing a target song in response to a selection operation for the target song in the at least one candidate song.

Step 205: Receive a song practice instruction for the target song of the target singer in response to a trigger operation for the audio recording entrance.

Step 206: Collect a practice audio of practice performed by a current object on a song of the target singer in response to the song practice instruction.

Of course, a current user exits from the song practice interface exits if the current user stops practicing in the midway.

Step 207: Present a machine score corresponding to the practice audio.

Step 208: Judge whether the machine score reaches a scoring threshold value.

Here, the current object may judge what improvement space a timbre score and an emotion score have by oneself according to a practice timbre obtained after converting the practice audio each time (i.e., a converted sound), and singing skills, an emotion fullness degree, air sound, sound transition and the like of the original target singer are simulated through multiple times of practice so as to increase the machine score such as the timbre score and the emotion score. Step 209 is executed when the machine score reaches the scoring threshold value (for example, 100 is a full score, and the scoring threshold value may be set to be 80); and step 205 is executed when the machine score does not reach the scoring threshold value.

Step 209: Put the practice audio into a voting pool corresponding to the target singer for manual scoring.

Here, the practice audio to be scored is put into the voting pool corresponding to the target singer so as to push the practice audio to terminals of other objects, and the other objects may score the practice audio of the current object through scoring entrances presented by their terminals and return an obtained manual score to the terminal of the current object for displaying.

Step 210: Present the manual score corresponding to the practice audio.

Here, the manual score may still be assessed from two aspects of a timbre similarity and an emotion similarity.

Step 211: Perform averaging processing on the machine score and the manual score to obtain a practice score corresponding to the practice audio and a song practice rank of a practiced song corresponding to the current object.

The practice score corresponding to the practice audio=(machine score (timbre score and emotion score)+manual score (timbre score and emotion score))/4, and taking a song B as an example, in its corresponding machine score, the timbre score=80, and the emotion score=75, in the manual score, the timbre score=78, and the emotion score=70, and thus the practice score of the song=(80+75+78+70)/4=75.75.

Here, when a plurality of persons practice the song of the target singer, descending song practice ranks may be determined according to a sequence from high to low of practice scores of users practicing the target singer, and the song practice rank of the current object in the song practice ranks is determined.

Step 212: Judge whether the song practice rank is located before a target rank.

For example, when a plurality of users practice a song of a singer A, descending song practice ranks are determined according to practice scores of the users, assuming that only top 3 users have a creation qualification of creating a concert of the singer A, whether the song practice rank of the current object is in top 3 is judged according to the practice score of the current object (i.e., judging whether it is located before No. 4), and step 213 is executed when it is determined that the song practice rank of the current object is located before No. 4; otherwise, step 201 is performed.

Step 213: Present a concert entrance for creating a concert of the target singer.

In practical applications, the concert entrance and the song practice entrance may be or may not be the same entrance, and when the two are the same entrance, if the current object has the creation qualification of creating the concert, indication information for indicating that the current object has the creation qualification of creating the concert is presented in an associated region of the song practice entrance (for example, a "red point" is used for indication at the song practice entrance).

Step 214: Present prompt information for prompting whether to apply to create the concert for the target singer in response to a trigger operation for the concert entrance.

Step 215: Receive a concert creation instruction for the target singer when a determining operation for the prompt information is received.

Here, the current object may decide whether to create the concert corresponding to the target singer based on the prompt information, when the current object decides to create the concert corresponding to the target singer, the determining operation may be triggered by triggering a corresponding determining button, and when the terminal receives the determining operation, the terminal may receive the concert creation instruction corresponding to the target singer; otherwise, when the current object decides not to create the concert corresponding to the target singer, a canceling operation may be triggered by triggering a corresponding canceling button, when the terminal receives the canceling operation, the terminal will not receive the concert creation instruction corresponding to the target singer, at the moment, the song practice entrance may be presented in the song practice interface, and the current object may practice the songs of the target singer or songs of other singers through the song practice entrance.

Step 216: Create a concert room for simulating singing the song of the target singer in response to the concert creation instruction.

The concert room is used for the current object to sing the song of the target singer by simulating the target singer, and all users entering the concert room may view a singing content of the current object singing the song of the target singer in the concert room.

Step 217: Collect the singing content corresponding to simulated singing of the current object for the song of the target singer, and play the singing content through the concert room.

Figure 17:
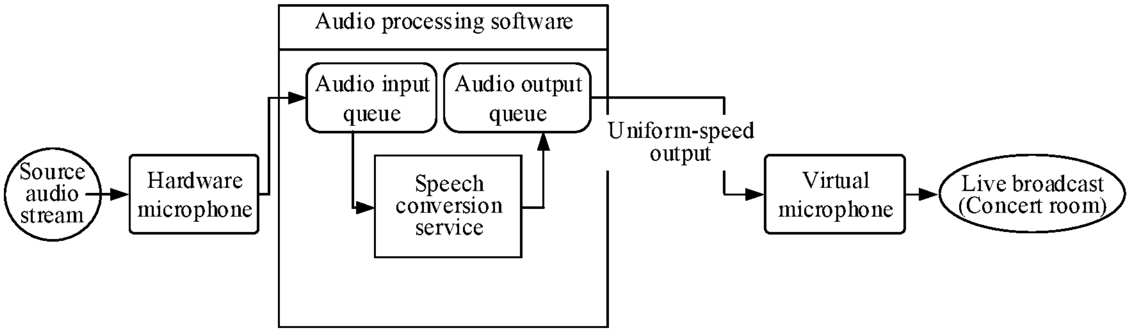
FIG. 17 is a processing flowchart of a virtual concert provided by an embodiment of this application.

Here, referring to FIG. 17, FIG. 17 is a processing flowchart of a virtual concert provided by an embodiment of this application. Holding of the virtual concert requires pseudo-real-time singing conversion using a speech conversion service in audio processing software, for example, when the current object sings songs in the concert room, a source audio stream of singing is collected in real time through a hardware microphone, the collected source audio stream is transmitted to the speech conversion service in a queue form, after the source audio stream is subjected to speech conversion through the speech conversion service, a converted target audio stream is still outputted to a virtual microphone in the concert room with a uniform speed in the queue form, and the target audio stream is played in a live-broadcast manner in the concert room through the virtual microphone to achieve the purpose of playing the singing content.

Next, the machine score is described, after a user completes practice, the terminal loads the speech conversion service, timbre conversion is performed on the collected practice audio through a speech conversion technology, the collected practice audio is converted into a timbre similar to the original target singer to obtain a practice timbre corresponding to the target singer, the practice timbre and the original singing timbre of the target singer are compared to obtain a corresponding timbre similarity, and a timbre score is determined based on the timbre similarity; meanwhile, emotion degree recognition is performed on the practice audio to obtain a corresponding practice emotion degree, the practice emotion degree is compared with an original singing emotion degree of the target singer to obtain a corresponding emotion similarity, an emotion score is determined based on the emotion similarity, and the timbre score and the emotion score are used as the machine score.

Referring to FIG. 18, FIG. 18 is a schematic diagram of timbre conversion provided by an embodiment of this application. When timbre conversion is performed on the practice audio, phonemic recognition is performed on the practice audio through a phonemic recognition model to obtain a corresponding phoneme sequence; sound loudness recognition is performed on the practice audio to obtain a corresponding sound loudness feature; melody recognition is performed on the practice audio to obtain a sine excitation signal for representing a melody; and fusing processing is performed on the phoneme sequence, the sound loudness feature and the sine excitation signal through a sound wave synthesizer to obtain the practice timbre corresponding to the target singer.

The phonemic recognition model is also called a PPG extractor, and is a part of an ASR model, the ASR model has a function of converting a speech to text, its essence is converting the speech to the phoneme sequence first and then converting the phoneme sequence to the text, while the PPG extractor has a function of converting the speech to the phoneme sequence first, that is, it is used for extracting information irrelevant to the timbre from the practice audio, such as text content information.

Referring to FIG. 19, FIG. 19 is a schematic structural diagram of the phonemic recognition model provided by an embodiment of this application. Before timbre recognition is performed, considering that the practice audio is a chaotic wave signal on the time domain in practical applications, to facilitate analysis, the practice audio on the time domain may be converted to a frequency domain through fast Fourier transformation to obtain audio spectra corresponding to audio data, then difference degrees between the audio spectra corresponding to adjacent sampling windows are calculated based on the obtained audio spectra, then energy spectra corresponding to the sampling windows are determined based on the plurality of obtained difference degrees, and finally a spectrogram (such as a Mel spectrogram) corresponding to the practice audio is obtained; and afterwards, downsampling processing is performed on a downsampling layer of the spectrogram corresponding to the practice audio, where the downsampling layer is of a two-dimensional convolutional structure, downsampling processing is performed on the input spectrogram with a 2-times time scale to obtain a downsampling feature, then the downsampling feature is input to an encoder (may be an integration encoder or a transformer encoder) for encoding processing to obtain a corresponding encoding feature, and then the encoding feature is input to a decoder for decoding processing to predict the phoneme sequence of the practice audio, where the decoder may be a CTC decoder, the decoder includes a full connection layer, and a decoding process is as follows: a phoneme with a maximum probability is screened out from each frame of practice audio according to the encoding feature, a phoneme temporal sequence is constituted by the screened phoneme with the maximum probability corresponding to each frame of practice audio, and adjacent identical phonemes in the phoneme temporal sequence are combined to obtain the phoneme sequence.

When the spectrogram of the practice audio is obtained, the practice audio may be segmented by frame, then after Fourier transformation is performed on each frame of signal to obtain the spectra, the spectra are superposed along a time dimension to obtain the spectrogram, and the spectrogram may reflect, on the time dimension, the change of sine waves superposed in a sound signal over time. Alternatively, on the basis of obtaining the spectrogram, a Mel spectrogram is obtained by performing filtering on the spectra by using a filter that has been designed, and compared with a general spectrogram, it has fewer frequency dimensions and focuses more on a low-frequency-band sound signal to which human ears are more sensitive; and it is generally considered that, compared with the sound signal, the Mel diagram is easier for extraction/separation of its information and easier for modification of sound.

When the phonemic recognition model is trained, training may be performed by adopting a large number of speech-text training samples, and a loss function of training may use a CTC loss:

$$L = \sum_{X,Y \in D} -\log P(Y \mid X),$$

where X is a phoneme sequence corresponding to prediction text, Y is a phoneme sequence corresponding to target text, and a likelihood function of the two is:

$$P(Y \mid X) = \sum_{A \in A_{X,Y}} \prod_{t=1}^{T} p_t(a_t \mid X).$$

The sound loudness feature is a time sequence of loudness of each frame of practice audio in the practice audio, namely a maximum amplitude corresponding to each frame of practice audio obtained after performing short-time Fourier transformation on the practice audio; and the sine excitation signal is obtained by calculation using a base frequency of a sound (F0, a base frequency of each frame of the sound is equivalent to a pitch of each frame of sound).

Figure 20:
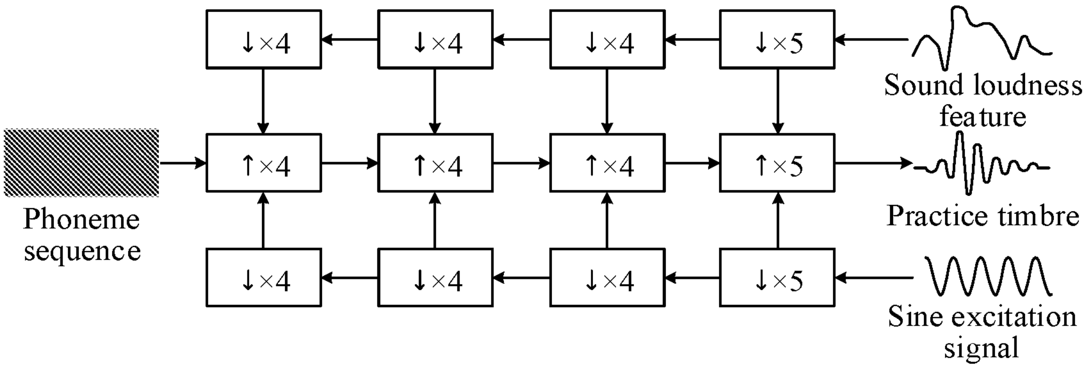
FIG. 20 is a schematic structural diagram of a sound wave synthesizer provided by an embodiment of this application.
Figure 21:
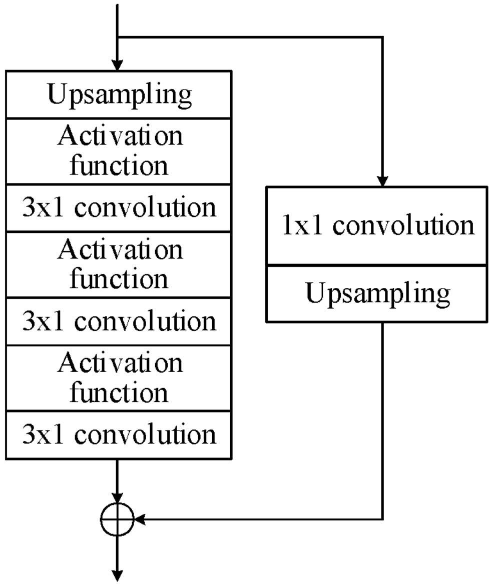
FIG. 21 is a schematic structural diagram of an upsampling block provided by an embodiment of this application.
Figure 22:
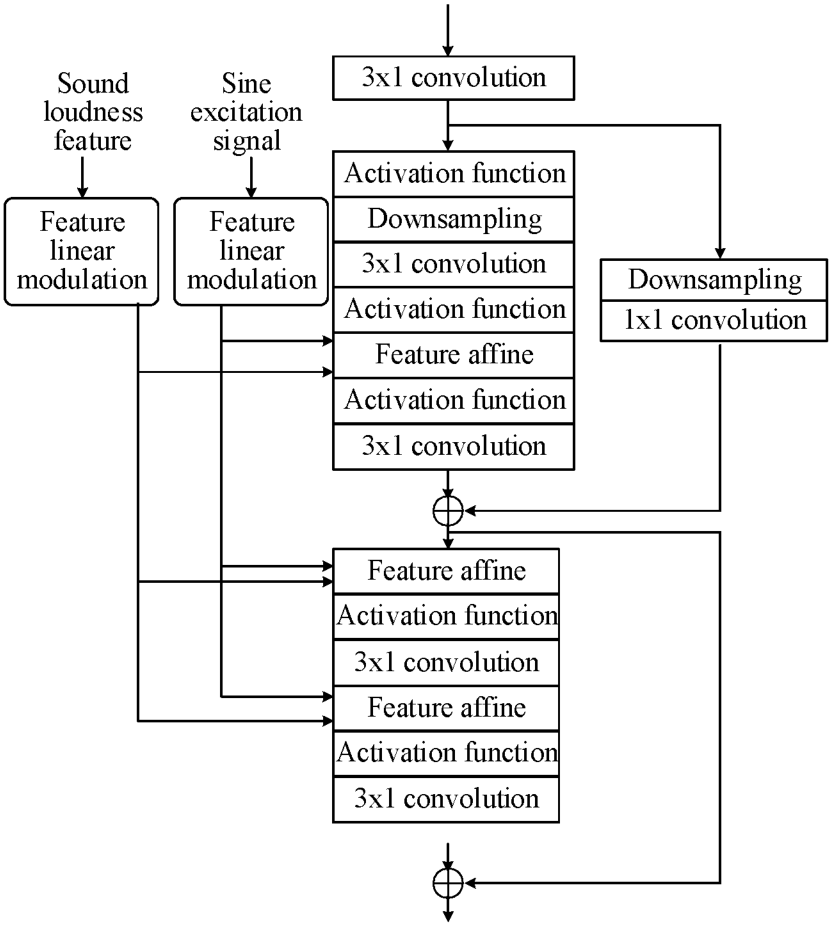
FIG. 22 is a schematic structural diagram of a downsampling block provided by an embodiment of this application.
Figure 23:
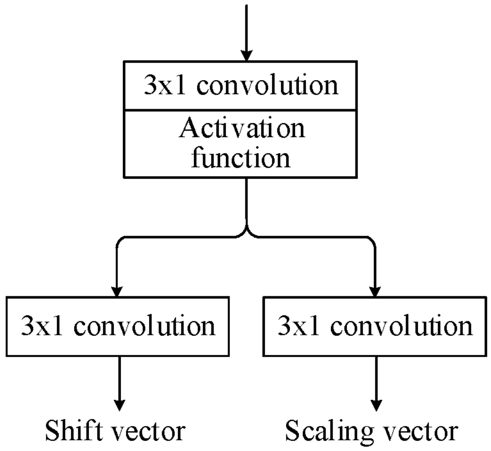
FIG. 23 is a schematic diagram of a feature linear modulation module provided by an embodiment of this application.

The sound wave synthesizer aims to synthesize three features irrelevant to the timbre of a speaker: the phoneme sequence, the sound loudness feature and the sine excitation signal of the practice audio, to form sound waves of singing which is sung by using the timbre of the target singer (i.e., the above practice timbre corresponding to the target singer). Referring to FIG. 20, FIG. 20 is a schematic structural diagram of the sound wave synthesizer provided by an embodiment of this application. The sound wave synthesizer includes a plurality of upsampling blocks and downsampling blocks, in order to convert the practice audio into the practice timbre (i.e., sound waves) corresponding to the target singer, the above obtained phoneme sequence is subjected to upsampling processing gradually by applying 4 upsampling blocks with factors of 4, 4, 4 and 5, the above obtained sound loudness feature and sine excitation signal are subjected to downsampling processing gradually by applying 4 downsampling blocks with factors of 4, 4, 4 and 5, and features obtained by processing are fused to obtain the practice timbre corresponding to the target singer. As shown in FIG. 21, FIG. 21 is a schematic structural diagram of a downsampling block provided by an embodiment of this application. The obtained phoneme sequence is inputted to an upsampling block, and a corresponding upsampling feature is obtained after upsampling, a multi-layer activation function and convolution processing. As shown in FIG. 22, FIG. 22 is a schematic structural diagram of an upsampling block provided by an embodiment of this application. The obtained sound loudness feature and sine excitation signal are inputted to the upsampling block, and a corresponding upsampling feature is obtained after upsampling, a multi-layer activation function, convolution processing and processing by a feature linear modulation (FiLM) module, where the FiLM module is configured to perform feature affine, and information of the sine excitation signal and the sound loudness feature is fused with the phoneme sequence to produce a scaling vector and shift vector with an input given. As shown in FIG. 23, FIG. 23 is a schematic diagram of the feature linear modulation module provided by an embodiment of this application. The FiLM module and the corresponding upsampling block have the same number of convolution channels.

When the sound wave synthesizer is trained, an auto-rebuild training manner may be adopted, that is, singing audios of a large number of target speakers are used as training audios, then phoneme sequences, sound loudness features and sine excitation signals are separated out of these audios to be used as inputs of the sound wave synthesizer, the audios themselves are used as predicted outputs of the sound wave synthesizer for training, and an objective loss function of training is as follows: $L_G = L_{stft} + \alpha L_{adv}$, where α is an impact factor and may be set accordingly (e.g., set to be 2.5), $L_{stft}$ is a multi-resolution STFT auxiliary loss, $L_{adv}$ is an adversarial training loss, an extra arbiter $D_k(x)$ is introduced by the model in the training process, the arbiter is configured to judge whether an audio x is a real audio, and expressions of the two losses are as follows:

$$L_{stft} = \frac{1}{|M|}\sum_{m \in M}\left(\frac{\|S_m - \hat{S}_m\|_2}{\|S_m\|_2} + \frac{\|\log S_m - \log \hat{S}_m\|_1}{N}\right),$$

where $S_m$ is a frequency domain information sequence obtained after short-time discrete Fourier transformation on an input audio, $$\hat{S}_m$$

is a frequency domain information sequence obtained after short-time discrete Fourier transformation on a predicted audio, M represents M single short-time Fourier transformation losses, and m is a frame number of the input audio.

$$L_{adv} = \frac{1}{k}\sum_k \|1 - D_k(\hat{x})\|_2,$$

where a loss of the arbiter $D_k$ (x) is $$L_D = \frac{1}{k}\sum_k (\|1 - D_k(x)\|_2 + \|D_k(\hat{x})\|_2),$$

x is a real audio, and $\hat{x}$ is an audio generated by the model.

In this way, when the practice timbre of the practice audio is obtained, the practice timbre may be compared with the original singing timbre, and the corresponding timbre score is determined based on a comparison result.

Figure 24:
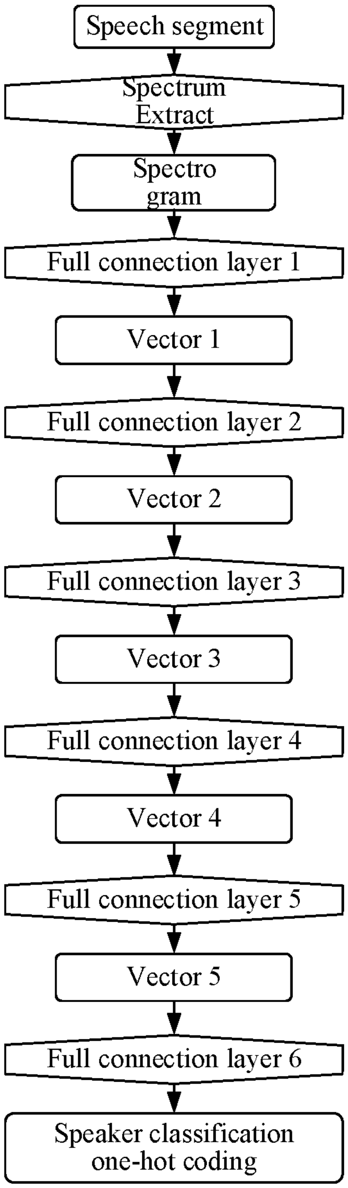
FIG. 24 is a schematic structural diagram of a speaker recognition model provided by an embodiment of this application.

When the timbre score is determined, timbre comparison may further be performed based on a speaker recognition model, where a structure of the speaker recognition model is a shown in FIG. 24. FIG. 24 is a schematic structural diagram of the speaker recognition model provided by an embodiment of this application. Tasks trained in the model are multi-classification tasks, 6 full connection layers are used for performing speaker classification training, training source speeches are a large amount of data with marked speakers, a training objective is one-hot coding of speaker classifications, and a loss function uses a cross entropy loss, namely $$H(p, q) = \sum_x p(x) \cdot \log\left(\frac{1}{q(x)}\right),$$

where p is a one-hot code of a target speaker, and q is a final output (a probability that a speech fragment corresponds to a speaker) of the model. During model prediction, the last layer of full connection is discarded, a vector 5 in the figure is obtained by prediction using the first five layers of full connection, and the vector may be used as the practice timbre, corresponding to the target singer, of the practice audio. During comparison, an original singing audio of the target singer singing a song, which is prepared in advance, is inputted to the speaker recognition model for timbre recognition, so as to obtain the corresponding original singing timbre; and the practice timbre of the current object and the original singing timbre of the original singer are subjected to similarity comparison, for example, a cosine similarity of the two is calculated, the smaller a cosine distance, the larger the similarity of the two, correspondingly, the closer the timbres of the two audios, that is, the current object and the original singer are closer in timbre, and a calculation manner is:

$$\text{Score} = 100\ \ln\left(\frac{e-1}{2} \cdot \frac{\vec{x} \cdot \vec{y}}{\|\vec{x}\| \cdot \|\vec{y}\|} + \frac{e+1}{2}\right),$$

where $\vec{x}$ and $\vec{y}$ represent feature representations of the practice timbre and the original singing timbre respectively, during calculation, the original singing audio of the target singer is cut with every 3 seconds as a segment and every 1 second as a sliding window, the same processing is performed on the practice audio of the current object, then scoring is performed on feature representations of the corresponding segments, and finally averaging processing is performed on scores of all the segments to obtain the final timbre score. When the emotion score is determined, reference may be made to the above method adopted for determining the timbre score, the same model is used for training and inferring, the difference is that its training task is a sentiment multi-classification task instead of the speaker multi-classification task, and training data also need a large amount of audio data with sentiment labels.

In this way, the current object may hold or create the virtual concert corresponding to the target singer, and when the current object sings the song of the target singer in the concert room, the relevant singing content is played through the concert room, for example, in addition to playing the singing of the current object singing the song, at least one of a virtual stage, virtual audiences and a virtual background is further presented, where a virtual human image corresponding to the target singer may be presented in the virtual stage, or a real image of the current object or a virtual human image corresponding to the current object may be presented; the virtual audiences are used for representing other objects entering the concert room to view the concert, and may be displayed in the form of virtual human images; and the virtual background may be a picture related to a currently sung song, such as a singing picture of the target singer singing the current song in the past (a picture in an MV or a picture of a real concert), or a real picture of the current object currently singing the song. In addition, interaction information of other objects entering the concert room for the current singing content may further be presented, such as issued bullet comment information and likes, in this way, it is conducive to better transferring emotions for the target singer while contents played in the concert are enriched, more entertainment choices are provided to users, and the increasing diversified requirements for user information are met.

The method for processing the virtual concert provided by this embodiment of this application may further be applied to a game scenario, for example, a user or player presents the song practice interface of the current object in a game live-broadcast client, the concert entrance is presented in the song practice interface, and the concert creation instruction for the target singer is received based on the concert entrance; the concert room for simulating singing the song of the target singer is created in response to the concert creation instruction; and the singing content corresponding to simulated singing of the current object for the song of the target singer is collected, and the singing content is played through the concert room for terminals corresponding to other players or users in the concert room to play the singing content through the concert room.

In the following, an exemplary structure, implemented as a software module, of an apparatus 555 for processing a virtual concert provided by an embodiment of this application continues to be described. In some embodiments, software modules in the apparatus 555 for processing the virtual concert stored in the memory 550 in FIG. 2 may include: an instruction receiving module 5551, configured to receive a concert creation instruction for a target singer based on a presented concert entrance; a room creating module 5552, configured to create a concert room for simulating singing a song of the target singer in response to the concert creation instruction; and a singing play module 5553, configured to collect a singing content of the song of the target singer in simulated singing of a current object, and play the singing content through the concert room; the singing content being used for being played by terminals of objects in the concert room.

In some embodiments, the apparatus further includes: an entrance presenting module, configured to present a song practice entrance in a song practice interface; receive a song practice instruction for the target singer based on the song practice entrance; collect a practice audio of practice performed by the current object on the song of the target singer in response to the song practice instruction; and present the concert entrance associated with the target singer in the corresponding song practice interface of the current object when determining that the current object has a creation qualification of creating a concert of the target singer based on the practice audio.

In some embodiments, the entrance presenting module is further configured to present a singer selection interface in response to a trigger operation for the song practice entrance, the singer selection interface including at least one candidate singer; present at least one candidate song corresponding to the target singer in response to a selection operation for the target singer in the at least one candidate singer; present an audio recording entrance for singing a target song in response to a selection operation for the target song in the at least one candidate song; and receive the song practice instruction for the target song of the target singer in response to a trigger operation for the audio recording entrance.

In some embodiments, the apparatus further includes: a first qualification determining module, configured to present a practice score corresponding to the practice audio; and determine that the current object has the creation qualification of creating the concert of the target singer when the practice score reaches a target score.

In some embodiments, the apparatus further includes: a first score obtaining module, configured to present, when the number of practiced songs is at least two, practice scores corresponding to practice audios of the current object for the songs; obtain singing difficulties of the songs, and determine weights of the corresponding songs based on the singing difficulties; and weight and average the practice scores of the practice audios of the songs based on the weights to obtain a practice score of the practice audios.

In some embodiments, the practice score includes at least one of the following: a timbre score and an emotion score; and the score obtaining module further includes: a second score obtaining module, configured to perform timbre conversion on the practice audio when the practice score includes the timbre score, to obtain a practice timbre corresponding to the target singer, compare the practice timbre with an original singing timbre of the target singer to obtain a corresponding timbre similarity, and determine the timbre score based on the timbre similarity; and perform emotion degree recognition on the practice audio when the practice score includes the emotion score, to obtain a corresponding practice emotion degree, compare the practice emotion degree with an original singing emotion degree of the target singer singing the song to obtain a corresponding emotion similarity, and determine the emotion score based on the emotion similarity.

In some embodiments, the second score obtaining module is further configured to perform phonemic recognition on the practice audio through a phonemic recognition model to obtain a phoneme sequence; perform sound loudness recognition on the practice audio to obtain a sound loudness feature; perform melody recognition on the practice audio to obtain a sine excitation signal for representing a melody; and fuse the phoneme sequence, the sound loudness feature and the sine excitation signal through a sound wave synthesizer to obtain the practice timbre corresponding to the target singer.

In some embodiments, the apparatus further includes: a third score obtaining module, configured to transmit the practice audio to terminals of other objects to make the terminals of the other objects obtain manual scores of the inputted practice audio based on a scoring entrance corresponding to the practice audio; and receive the manual scores returned by the other terminals, and determine the practice score corresponding to the practice audio based on the manual scores.

In some embodiments, the third score obtaining module is further configured to obtain machine scores corresponding to the practice audio, and transmit the practice audio to the terminals of the other objects when the machine scores reach a scoring threshold value; and perform averaging processing on the machine scores and the manual scores to obtain the practice score corresponding to the practice audio.

In some embodiments, the apparatus further includes: a second qualification determining module, configured to present a song practice rank of the current object corresponding to the song; and determine that the current object has a creation qualification of creating a concert of the target singer when the song practice rank is before a target rank.

In some embodiments, the apparatus further includes: a detail viewing module, configured to present, when the number of the practiced songs is at least two, a total score of the current object singing the at least two songs and a detail entrance for viewing score details for the songs; and present a detail page in response to a trigger operation for the detail entrance, and present practice scores corresponding to the songs in the detail page.

In some embodiments, the instruction receiving module is further configured to present a singer selection interface in response to a trigger operation for the concert entrance, the singer selection interface including at least one candidate singer; and receive a concert creation instruction corresponding to the target singer when determining that the current object has the creation qualification of creating the concert of the target singer in response to a selection operation for the target singer in the at least one candidate singer.

In some embodiments, the instruction receiving module is further configured to present a singer selection interface in response to a trigger operation for the concert entrance, the singer selection interface including at least one candidate singer, and the current object having a creation qualification of creating concerts of the candidate singers; and receive the concert creation instruction for the target singer in response to a selection operation for the target singer in the at least one candidate singer.

In some embodiments, the instruction receiving module is further configured to present prompt information for prompting whether to apply to create the concert corresponding to the target singer in response to a trigger operation for the concert entrance when the concert entrance is associated with the target singer; and receive the concert creation instruction for the target singer when a determining operation for the prompt information is received.

In some embodiments, the instruction receiving module is further configured to present an application interface for applying creation of the concert of the target singer when the determining operation for the prompt information is received, and present an editing entrance for editing information related to the concert in the application interface; receive the concert information edited based on the editing entrance; and receive the concert creation instruction for the target singer in response to a determining operation for the concert information.

In some embodiments, the instruction receiving module is further configured to present an appointment entrance for appointing creation of the concert room while presenting the prompt information; present an appointment interface for appointing creation of the concert of the target singer in response to a trigger operation for the appointment entrance, and present an editing entrance for editing concert appointment information in the appointment interface; receive the concert appointment information edited based on the editing entrance, the concert appointment information at least including a concert start time point; and receive the concert creation instruction corresponding to the target singer in response to a determining operation for the concert appointment information. The room creating module is further configured to create the concert room for simulating singing the song of the target singer in response to the concert creation instruction, and enter and present the concert room when the concert start time point is reached.

In some embodiments, the apparatus further includes: a concert canceling module, configured to present a song practice entrance in the song practice interface when a canceling operation for the prompt information is received. The song practice entrance is used for practicing the song of the target singer or songs of other singers.

In some embodiments, when the number of the concert entrance is at least one, the concert entrance is associated with a singer, and the concert entrance has a corresponding relationship with the associated singer. The instruction receiving module is further configured to receive the concert creation instruction for the target singer in response to a trigger operation for the concert entrance associated with the target singer.

In some embodiments, the apparatus further includes: an interaction module, configured to present interaction information of other objects with the singing content in the concert room in a process of playing the singing content through the concert room.

In some embodiments, the singing content includes an audio content of singing of the song of the target singer, and the singing play module is further configured to collect a singing audio of the current object singing the song of the target singer; perform timbre conversion on the singing audio to obtain a converted audio, corresponding to a timbre of the target singer, of the singing audio, and use the converted audio as the audio content of the singing content.

An embodiment of this application provides a computer program product or a computer program, the computer program product or the computer program including computer instructions, and the computer instructions being stored in a non-transitory computer-readable storage medium. A processor of a computer device reads the computer instructions from the computer readable storage medium, and the processor executes the computer instructions to cause the computer device to execute the above method for processing the virtual concert in this embodiment of this application.

An embodiment of this application provides a non-transitory computer-readable storage medium storing an executable instruction, where the executable instruction is stored, and when executed by a processor, the executable instruction will cause the processor to execute the method for processing the virtual concert provided by this embodiment of this application, such as the method shown in FIG. 3.

In some embodiments, the computer readable storage medium may be a memory such as a ferroelectric random access memory (FRAM), a read only memory (ROM), a programmable read only memory (PROM), an erasable programmable read only memory (EPROM), an electrically erasable programmable read-only memory (EEPROM), a flash memory, a magnetic surface memory, an optic disc, or a CD-ROM. The computer readable storage medium may also be various devices including one or any combination of the above memories.

In some embodiments, executable instructions may be in the form of programs, software, software modules, scripts, or codes, written in any form of programming language (including compiled or interpreted languages, or declarative or procedural languages), and may be deployed in any form, including being deployed as standalone programs or as modules, components, subroutines, or other units suitable for use in computing environments. In this application, the term "module" or the like in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

As an example, the executable instructions may but may not necessarily correspond to files in a file system, may be stored in part of a file that stores other programs or data, for example, stored in one or more scripts in hyper text markup language (HTML) documents, stored in a single file dedicated to a program in question, or, stored in multiple collaborative files (such as files that store one or more modules, subroutines, or code parts).

As an example, the executable instructions may be deployed to be executed on one computing device, or on multiple computing devices located in one location, or on multiple computing devices distributed across multiple locations and interconnected through communication networks.

The above is merely the embodiments of this application and are not intended to limit the protection scope of this application. Any modification, equivalent replacement, or improvement, etc. made within the spirit and scope of this application shall fall within the protection scope of this application.

What is claimed is:

1. A method for processing a virtual concert for a target singer performed by an electronic device, the method comprising:
presenting a song practice entrance in a song practice interface of a current object;
receiving a song practice instruction for the target singer based on the song practice entrance;
collecting a practice audio of singing practice performed by the current object on a song of the target singer in response to the song practice instruction;
presenting a concert entrance associated with the target singer in the song practice interface of the current object in response to a determination that, when singing the song of the target singer, sound and timbre of the current object are closer to those of the target singer than a predetermined threshold based on the practice audio;
receiving a concert creation instruction for a target singer based on the concert entrance associated with the target singer;
creating a concert room associated with the target singer for simulating singing a song of the target singer in response to the concert creation instruction;
collecting a singing content of simulated singing performed by the current object on the song of the target singer; and
playing the singing content by a terminal associated with the current object through the concert room associated with the target singer to create the virtual concert for the target singer.

2. The method according to claim 1, wherein the receiving a concert creation instruction for a target singer comprises:
presenting a singer selection interface, the singer selection interface comprising at least one candidate singer; and
receiving the concert creation instruction for the target singer when determining that the current object has a creation qualification of creating a concert of the target singer in response to a selection operation for the target singer in the at least one candidate singer.

3. The method according to claim 1, wherein the receiving a concert creation instruction for a target singer comprises:
presenting a singer selection interface, the singer selection interface comprising at least one candidate singer, and the current object having a creation qualification of creating concerts of the at least one candidate singer; and
receiving the concert creation instruction for the target singer in response to a selection operation for the target singer in the at least one candidate singer.

4. The method according to claim 1, wherein the receiving a concert creation instruction for a target singer comprises:
presenting prompt information when the concert entrance is associated with the target singer, the prompt information being used for prompting an application to create a concert corresponding to the target singer; and
receiving the concert creation instruction for the target singer when a determining operation for the prompt information is received.

5. The method according to claim 1, further comprising:
presenting interaction information of other objects with the singing content in the concert room in a process of playing the singing content through the concert room.

6. The method according to claim 1, wherein the singing content comprises an audio content of simulated singing performed on the song of the target singer, and the collecting a singing content of simulated singing performed by the current object on the song of the target singer comprises:
collecting a singing audio of simulated singing performed by the current object on the song of the target singer; and
performing timbre conversion on the singing audio to obtain a converted audio, corresponding to a timbre of the target singer, of the singing audio, and using the converted audio as the singing content.

7. An electronic device, comprising:
a memory, configured to store an executable instruction; and
a processor, configured to implement, when executing the executable instruction stored in the memory, a method for processing a virtual concert including:
presenting a song practice entrance in a song practice interface of a current object;
receiving a song practice instruction for the target singer based on the song practice entrance;
collecting a practice audio of singing practice performed by the current object on a song of the target singer in response to the song practice instruction;
presenting a concert entrance associated with the target singer in the song practice interface of the current object in response to a determination that, when singing the song of the target singer, sound and timbre of the current object are closer to those of the target singer than a predetermined threshold based on the practice audio;
receiving a concert creation instruction for a target singer based on the concert entrance associated with the target singer;
creating a concert room associated with the target singer for simulating singing a song of the target singer in response to the concert creation instruction;
collecting a singing content of simulated singing performed by the current object on the song of the target singer; and
playing the singing content by a terminal associated with the current object through the concert room associated with the target singer to create the virtual concert for the target singer.

8. The electronic device according to claim 7, wherein the receiving a concert creation instruction for a target singer comprises:
presenting a singer selection interface, the singer selection interface comprising at least one candidate singer; and
receiving the concert creation instruction for the target singer when determining that the current object has a creation qualification of creating a concert of the target singer in response to a selection operation for the target singer in the at least one candidate singer.

9. The electronic device according to claim 7, wherein the receiving a concert creation instruction for a target singer comprises:
presenting a singer selection interface, the singer selection interface comprising at least one candidate singer, and the current object having a creation qualification of creating concerts of the at least one candidate singer; and
receiving the concert creation instruction for the target singer in response to a selection operation for the target singer in the at least one candidate singer.

10. The electronic device according to claim 7, wherein the receiving a concert creation instruction for a target singer comprises:

presenting prompt information when the concert entrance is associated with the target singer, the prompt information being used for prompting an application to create a concert corresponding to the target singer; and receiving the concert creation instruction for the target singer when a determining operation for the prompt information is received.

11. The electronic device according to claim 7, wherein the method further comprises:

presenting interaction information of other objects with the singing content in the concert room in a process of playing the singing content through the concert room.

12. The electronic device according to claim 7, wherein the singing content comprises an audio content of simulated singing performed on the song of the target singer, and the collecting a singing content of simulated singing performed by the current object on the song of the target singer comprises:

collecting a singing audio of simulated singing performed by the current object on the song of the target singer; and performing timbre conversion on the singing audio to obtain a converted audio, corresponding to a timbre of the target singer, of the singing audio, and using the converted audio as the singing content.

13. A non-transitory computer readable storage medium, storing a computer-executable instruction, the computer-executable instruction, when executed by a processor of an electronic device, causing the electronic device to implement a method for processing a virtual concert including:

presenting a song practice entrance in a song practice interface of a current object;

receiving a song practice instruction for the target singer based on the song practice entrance;

collecting a practice audio of singing practice performed by the current object on a song of the target singer in response to the song practice instruction;

presenting a concert entrance associated with the target singer in the song practice interface of the current object in response to a determination that, when singing the song of the target singer, sound and timbre of the current object are closer to those of the target singer than a predetermined threshold based on the practice audio;

receiving a concert creation instruction for a target singer based on the concert entrance associated with the target singer;

creating a concert room associated with the target singer for simulating singing a song of the target singer in response to the concert creation instruction;

collecting a singing content of simulated singing performed by the current object on the song of the target singer; and playing the singing content by a terminal associated with the current object through the concert room associated with the target singer to create the virtual concert for the target singer.

14. The non-transitory computer readable storage medium according to claim 13, wherein the receiving a concert creation instruction for a target singer comprises:

presenting a singer selection interface, the singer selection interface comprising at least one candidate singer; and receiving the concert creation instruction for the target singer when determining that the current object has a creation qualification of creating a concert of the target singer in response to a selection operation for the target singer in the at least one candidate singer.

15. The non-transitory computer readable storage medium according to claim 13, wherein the receiving a concert creation instruction for a target singer comprises:

presenting a singer selection interface, the singer selection interface comprising at least one candidate singer, and the current object having a creation qualification of creating concerts of the at least one candidate singer; and receiving the concert creation instruction for the target singer in response to a selection operation for the target singer in the at least one candidate singer.

16. The non-transitory computer readable storage medium according to claim 13, wherein the receiving a concert creation instruction for a target singer comprises:

presenting prompt information when the concert entrance is associated with the target singer, the prompt information being used for prompting an application to create a concert corresponding to the target singer; and receiving the concert creation instruction for the target singer when a determining operation for the prompt information is received.

17. The non-transitory computer readable storage medium according to claim 13, wherein the singing content comprises an audio content of simulated singing performed on the song of the target singer, and the collecting a singing content of simulated singing performed by the current object on the song of the target singer comprises:

collecting a singing audio of simulated singing performed by the current object on the song of the target singer; and performing timbre conversion on the singing audio to obtain a converted audio, corresponding to a timbre of the target singer, of the singing audio, and using the converted audio as the singing content.

* * * * *